United States Patent
Koseki et al.

(10) Patent No.: US 9,647,603 B2
(45) Date of Patent: May 9, 2017

(54) CONTROLLER AND CONTROL METHOD FOR ELECTRIC MOTOR

(71) Applicant: HITACHI AUTOMOTIVE SYSTEMS, LTD., Hitachinaka-shi, Ibaraki (JP)

(72) Inventors: Tomonobu Koseki, Isesaki (JP); Tomishige Yatsugi, Isesaki (JP)

(73) Assignee: HITACHI AUTOMOTIVE SYSTEMS, LTD., Hitachinaka-Shi (JP)

( * ) Notice: Subject to any disclaimer, the term of this patent is extended or adjusted under 35 U.S.C. 154(b) by 0 days.

(21) Appl. No.: 15/124,774

(22) PCT Filed: Jan. 16, 2015

(86) PCT No.: PCT/JP2015/051058
§ 371 (c)(1),
(2) Date: Sep. 9, 2016

(87) PCT Pub. No.: WO2015/136976
PCT Pub. Date: Sep. 17, 2015

(65) Prior Publication Data
US 2017/0033725 A1 Feb. 2, 2017

(30) Foreign Application Priority Data
Mar. 14, 2014 (JP) ................................. 2014-051592

(51) Int. Cl.
*H02P 1/00* (2006.01)
*H02P 29/024* (2016.01)
(Continued)

(52) U.S. Cl.
CPC .............. *H02P 29/024* (2013.01); *H02P 6/14* (2013.01); *H02P 27/08* (2013.01); *B62D 5/0484* (2013.01); *B62D 5/0487* (2013.01)

(58) Field of Classification Search
CPC .................................. H02P 29/024; H02P 6/14
(Continued)

(56) References Cited

U.S. PATENT DOCUMENTS 5,691,611 A * 11/1997 Kojima ................ B60L 3/0023
318/400.04
2010/0117582 A1 5/2010 Ogawa et al.

FOREIGN PATENT DOCUMENTS

| JP | 2614788 B2 | 5/1997 |
| JP | 2009-201194 A | 9/2009 |

(Continued)

OTHER PUBLICATIONS

International Search Report dated Feb. 24, 2015 as issued in corresponding International Application No. PCT/JP2015/051058.

*Primary Examiner* — David S Luo
(74) *Attorney, Agent, or Firm* — Foley & Lardner LLP

(57) ABSTRACT

To provide controller and control method for an electric motor including plural energization systems composed of an inverter and coils corresponding to plural phases. According to the present invention, if any abnormality is detected in one energization system being energized through first diagnosis processing, second diagnosis processing is executed on the energization system having the abnormality detected, which is switched to an unenergized state. Then, if the second diagnosis processing reveals occurrence of a short-circuit, a control gain of a normal energization system is lowered. In addition, a threshold used in the first diagnosis processing on the normal energization system is changed so as to make it difficult to detect an abnormality, hereby keeping the energization control on the normal energization system. Hence, if a short-circuit occurs in at least one of the energization systems, it is possible to avoid stopping the output from the normal energization system.

16 Claims, 14 Drawing Sheets

(51) Int. Cl.
*H02P 27/08* (2006.01)
*H02P 6/14* (2016.01)
*B62D 5/04* (2006.01)

(58) Field of Classification Search
USPC .................................... 318/520, 519, 494
See application file for complete search history.

(56) References Cited

FOREIGN PATENT DOCUMENTS

JP  2010-011688 A  1/2010
JP  2010-115082 A  5/2010

* cited by examiner

FIG.11

| | STATE (ON/OFF CONTROL) OF EACH SWITCHING ELEMENT | | | | | | |
|---|---|---|---|---|---|---|---|
| | U-PHASE High-SIDE | V-PHASE High-SIDE | W-PHASE High-SIDE | U-PHASE Low-SIDE | V-PHASE Low-SIDE | W-PHASE Low-SIDE | POWER SUPPLY RELAY |
| U-PHASE High-SIDE SHORT | SHORT | OFF | OFF | ON | ON | ON | OFF |
| V-PHASE High-SIDE SHORT | OFF | SHORT | OFF | ON | ON | ON | OFF |
| W-PHASE High-SIDE SHORT | OFF | OFF | SHORT | ON | ON | ON | OFF |
| U-PHASE Low-SIDE SHORT | ON | ON | ON | SHORT | OFF | OFF | OFF |
| V-PHASE Low-SIDE SHORT | ON | ON | ON | OFF | SHORT | OFF | OFF |
| W-PHASE Low-SIDE SHORT | ON | ON | ON | OFF | OFF | SHORT | OFF |
| U-PHASE LINE SHORTED TO POWER SUPPLY (UPSTREAM OF POWER SUPPLY RELAY) | ON | ON | ON | OFF | OFF | OFF | ON OR OFF |
| V-PHASE LINE SHORTED TO POWER SUPPLY (UPSTREAM OF POWER SUPPLY RELAY) | ON | ON | ON | OFF | OFF | OFF | ON OR OFF |
| W-PHASE LINE SHORTED TO POWER SUPPLY (UPSTREAM OF POWER SUPPLY RELAY) | ON | ON | ON | OFF | OFF | OFF | ON OR OFF |
| U-PHASE LINE GROUNDED | ON | ON | ON | OFF | OFF | OFF | OFF |
| V-PHASE LINE GROUNDED | ON | ON | ON | OFF | OFF | OFF | OFF |
| W-PHASE LINE GROUNDED | ON | ON | ON | OFF | OFF | OFF | OFF |

FIG.12

| | STATE (ON/OFF CONTROL) OF EACH SWITCHING ELEMENT | | | | | | POWER SUPPLY RELAY |
|---|---|---|---|---|---|---|---|
| | U-PHASE High-SIDE | V-PHASE High-SIDE | W-PHASE High-SIDE | U-PHASE Low-SIDE | V-PHASE Low-SIDE | W-PHASE Low-SIDE | |
| U-PHASE High-SIDE SHORT | SHORT | ON | ON | ON | ON | ON | OFF |
| V-PHASE High-SIDE SHORT | ON | SHORT | ON | ON | ON | ON | OFF |
| W-PHASE High-SIDE SHORT | ON | ON | SHORT | ON | ON | ON | OFF |
| U-PHASE Low-SIDE SHORT | ON | ON | ON | SHORT | ON | ON | OFF |
| V-PHASE Low-SIDE SHORT | ON | ON | ON | ON | SHORT | ON | OFF |
| W-PHASE Low-SIDE SHORT | ON | ON | ON | ON | ON | SHORT | OFF |
| U-PHASE LINE SHORTED TO POWER SUPPLY (UPSTREAM OF POWER SUPPLY RELAY) | ON | ON | ON | OFF | OFF | OFF | ON OR OFF |
| V-PHASE LINE SHORTED TO POWER SUPPLY (UPSTREAM OF POWER SUPPLY RELAY) | ON | ON | ON | OFF | OFF | OFF | ON OR OFF |
| W-PHASE LINE SHORTED TO POWER SUPPLY (UPSTREAM OF POWER SUPPLY RELAY) | ON | ON | ON | OFF | OFF | OFF | ON OR OFF |
| U-PHASE LINE GROUNDED | ON | ON | ON | ON | ON | ON | OFF |
| V-PHASE LINE GROUNDED | ON | ON | ON | ON | ON | ON | OFF |
| W-PHASE LINE GROUNDED | ON | ON | ON | ON | ON | ON | OFF |

FIG.13

| | STATE (ON/OFF CONTROL) OF EACH SWITCHING ELEMENT | | | | | | POWER SUPPLY RELAY |
|---|---|---|---|---|---|---|---|
| | U-PHASE High-SIDE | V-PHASE High-SIDE | W-PHASE High-SIDE | U-PHASE Low-SIDE | V-PHASE Low-SIDE | W-PHASE Low-SIDE | |
| U-PHASE High-SIDE SHORT | SHORT | ON | ON | OFF | OFF | OFF | ON OR OFF |
| V-PHASE High-SIDE SHORT | ON | SHORT | ON | OFF | OFF | OFF | ON OR OFF |
| W-PHASE High-SIDE SHORT | ON | ON | SHORT | OFF | OFF | OFF | ON OR OFF |
| U-PHASE Low-SIDE SHORT | OFF | OFF | OFF | SHORT | ON | ON | ON OR OFF |
| V-PHASE Low-SIDE SHORT | OFF | OFF | OFF | ON | SHORT | ON | ON OR OFF |
| W-PHASE Low-SIDE SHORT | OFF | OFF | OFF | ON | ON | SHORT | ON OR OFF |
| U-PHASE LINE SHORTED TO POWER SUPPLY (UPSTREAM OF POWER SUPPLY RELAY) | ON | ON | ON | OFF | OFF | OFF | ON OR OFF |
| V-PHASE LINE SHORTED TO POWER SUPPLY (UPSTREAM OF POWER SUPPLY RELAY) | ON | ON | ON | OFF | OFF | OFF | ON OR OFF |
| W-PHASE LINE SHORTED TO POWER SUPPLY (UPSTREAM OF POWER SUPPLY RELAY) | ON | ON | ON | OFF | OFF | OFF | ON OR OFF |
| U-PHASE LINE GROUNDED | OFF | OFF | OFF | ON | ON | ON | ON OR OFF |
| V-PHASE LINE GROUNDED | OFF | OFF | OFF | ON | ON | ON | ON OR OFF |
| W-PHASE LINE GROUNDED | OFF | OFF | OFF | ON | ON | ON | ON OR OFF |

FIG.14

| | STATE (ON/OFF CONTROL) OF EACH SWITCHING ELEMENT | | | | | | POWER SUPPLY RELAY |
|---|---|---|---|---|---|---|---|
| | U-PHASE High-SIDE | V-PHASE High-SIDE | W-PHASE High-SIDE | U-PHASE Low-SIDE | V-PHASE Low-SIDE | W-PHASE Low-SIDE | |
| U-PHASE High-SIDE SHORT | SHORT | OFF | OFF | OFF | OFF | OFF | ON OR OFF |
| V-PHASE High-SIDE SHORT | OFF | SHORT | OFF | OFF | OFF | OFF | ON OR OFF |
| W-PHASE High-SIDE SHORT | OFF | OFF | SHORT | OFF | OFF | OFF | ON OR OFF |
| U-PHASE Low-SIDE SHORT | OFF | OFF | OFF | SHORT | OFF | OFF | ON OR OFF |
| V-PHASE Low-SIDE SHORT | OFF | OFF | OFF | OFF | SHORT | OFF | ON OR OFF |
| W-PHASE Low-SIDE SHORT | OFF | OFF | OFF | OFF | OFF | SHORT | ON OR OFF |
| U-PHASE LINE SHORTED TO POWER SUPPLY (UPSTREAM OF POWER SUPPLY RELAY) | OFF | OFF | OFF | OFF | OFF | OFF | ON OR OFF |
| V-PHASE LINE SHORTED TO POWER SUPPLY (UPSTREAM OF POWER SUPPLY RELAY) | OFF | OFF | OFF | OFF | OFF | OFF | ON OR OFF |
| W-PHASE LINE SHORTED TO POWER SUPPLY (UPSTREAM OF POWER SUPPLY RELAY) | OFF | OFF | OFF | OFF | OFF | OFF | ON OR OFF |
| U-PHASE LINE GROUNDED | OFF | OFF | OFF | OFF | OFF | OFF | ON OR OFF |
| V-PHASE LINE GROUNDED | OFF | OFF | OFF | OFF | OFF | OFF | ON OR OFF |
| W-PHASE LINE GROUNDED | OFF | OFF | OFF | OFF | OFF | OFF | ON OR OFF |

CONTROLLER AND CONTROL METHOD FOR ELECTRIC MOTOR

TECHNICAL FIELD

The present invention relates to a controller for an electric motor equipped with plural energization systems composed of inverters and coils corresponding to plural phases, and to a control method therefor.

BACKGROUND ART

Patent Document 1 discloses a controller for an AC electric motor that feeds voltage from a DC power supply to a multi-phase AC electric motor by means of a plurality of power converters. The controller comprises: detecting means for detecting output current from the power converters; first coordinate transforming means for transforming a detection value of current from one of the power converters into coordinates on a rotating coordinate system; second coordinate transforming means for transforming a detection value of current from the other power converter into coordinates on the rotating coordinate system; average value calculating means for calculating an average output current value based on output signals from the first and second coordinate transforming means; voltage command generating means for generating a representative two-phase voltage command value based on an output from the average value calculating means, an excitation current command value, and a torque current command value; correction signal generating means for generating a correction signal based on outputs from the first and second coordinate transforming means; voltage command correcting means for generating a plurality of two-phase voltage command values based on an output from the correction signal generating means and an output from the voltage command generating means; and a plurality of command coordinate transforming means for generating a three-phase voltage command based on an output from the voltage command correcting means, wherein unbalanced current of the multi-phase AC electric motor is reduced.

REFERENCE DOCUMENT LIST

Patent Document

Patent Document 1: Japanese Patent No. 2614788

SUMMARY OF THE INVENTION

Problems to be Solved by the Invention

In the electric motor equipped with plural energization systems composed of inverters and coils corresponding to plural phases, even if all switching elements of an inverter of one energization system having a short-circuit are turned OFF, there is a possibility of loop current being generated by way of the short-circuited portion to cancel out a magnetic flux generated by energizing a normal energization system.

In such cases, an apparent inductance in the normal energization system reduces and overshoot is observed in energization current, which might lead to erroneous detection of overcurrent or abnormal energization control, hereby stopping an output from an inverter of the normal energization system.

The present invention has been accomplished in view of some of the above problems and accordingly it is an object of the present invention to provide controller and control method for an electric motor, which can avoid an erroneous operation of stopping an output from a normal energization system in case a short-circuit occurs in some of plural energization systems.

Means for Solving the Problems

In order to achieve the object, the present invention provides a controller for an electric motor equipped with a plurality of energization systems, the controller comprising a control unit for detecting occurrence of a short-circuit in each of the energization systems through a first processing for detecting occurrence of an abnormality in the energization system being energized and a second processing for detecting occurrence of an abnormality in the energization system being unenergized, and changing, if a short-circuit is detected in at least one of the energization systems, a control parameter for the energization system having no short-circuit detected, wherein the control unit executes the second processing on the energization system having an abnormality detected through the first processing and executes, when no abnormality is detected through the second processing, the second processing on the energization system having no abnormality detected through the first processing.

Moreover, the present invention provides a control method for an electric motor, the method comprising the steps of: detecting occurrence of a short-circuit in each of a plurality of energization systems in response to a detection signal indicating an electrical condition of each coil through a first processing for detecting occurrence of an abnormality in the energization system being energized and a second processing for detecting occurrence of an abnormality in the energization system being unenergized; and reading a result of detecting occurrence of a short-circuit in each of the energization systems and changing, when a short-circuit is detected in at least one of the energization systems, a control parameter for the energization system having no short-circuit detected, wherein in the step of detecting occurrence of a short-circuit, the second processing is executed on the energization system having an abnormality detected through the first processing and when no abnormality is detected through the second processing, the second processing is executed on the energization system having no abnormality detected through the first processing.

Furthermore, the present invention provides a controller for an electric motor equipped with a plurality of energization systems composed of an inverter and coils corresponding to a plurality of phases, the controller comprising a control unit for detecting occurrence of a short-circuit in each of the energization systems, and changing, if a short-circuit is detected in at least one of the energization systems, a control parameter for the energization system having no short-circuit detected so that responsiveness to output control in the energization system having no short-circuit detected can be lowered compared to when no short-circuit is detected in all the energization system.

Effects of the Invention

According to the present invention, it is possible to avoid an erroneous operation of detecting overcurrent or abnormal energization control in a normal energization system under the influence of an energization system having a short-circuit as well as to allow a normal energization system to continue its output.

BRIEF DESCRIPTION OF THE DRAWINGS

FIG. 11 illustrates control patterns for an energization system having a short-circuit according to the embodiment of the present invention.

FIG. 12 illustrates control patterns for an energization system having a short-circuit according to the embodiment of the present invention.

FIG. 13 illustrates control patterns for an energization system having a short-circuit according to the embodiment of the present invention.

FIG. 14 illustrates control patterns for an energization system having a short-circuit according to the embodiment of the present invention.

MODE FOR CARRYING OUT THE INVENTION

Figure 1:
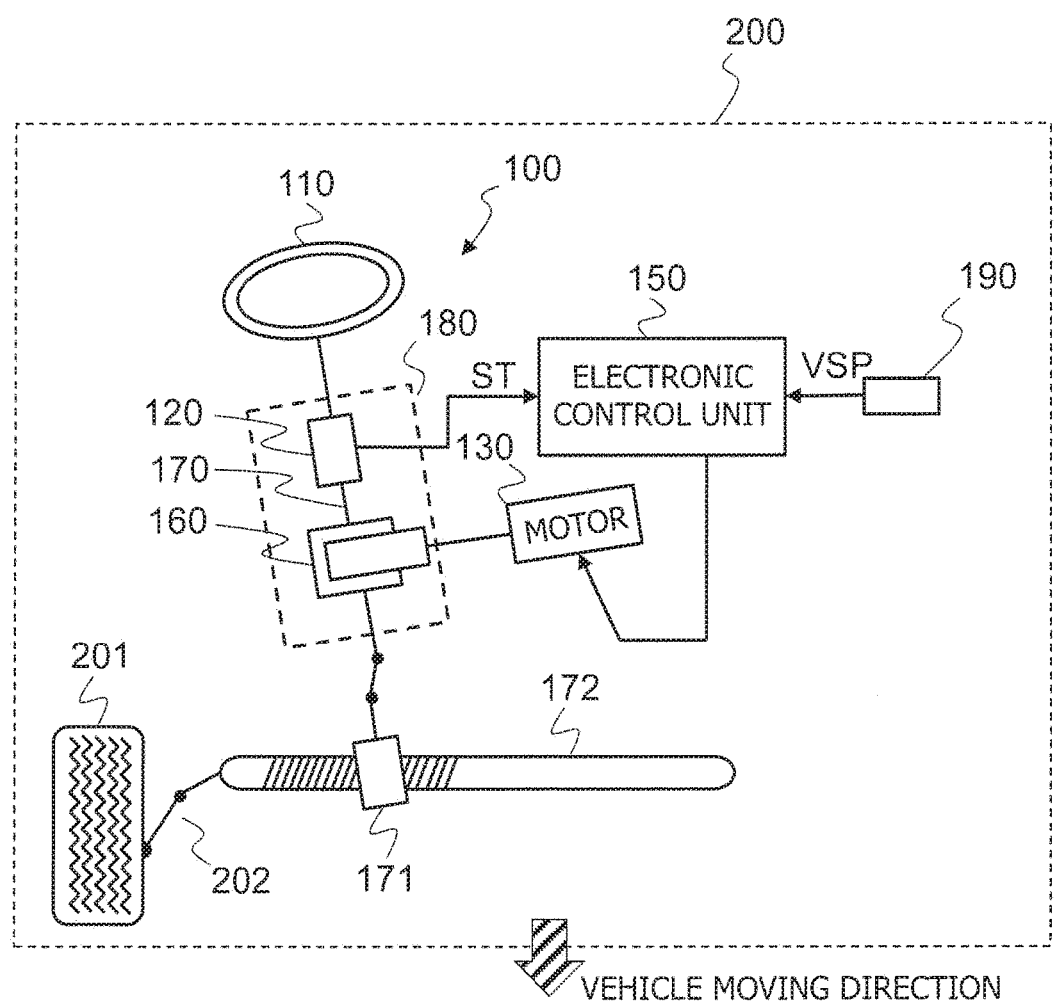
FIG. 1 is a schematic diagram of an electric power steering device that adopts a controller for an electric motor according to an embodiment of the present invention.

Hereinafter, an embodiment of the present invention will be described. FIG. 1 illustrates an example of a vehicle electric power steering device in which a controller for an electric motor according to the present invention is applied to an electric motor that generates a steering assist force. An electric power steering device 100 in FIG. 1, which is installed in a vehicle 200, generates a steering assist force with an electric motor 130.

Electric power steering device 100 is composed of a steering wheel 110, a steering torque sensor 120, electric motor 130, an electronic control unit 150, a reducer 160 that reduces a rotational speed of electric motor 130 and then transmits the reduced rotational speed to a steering shaft (pinion shaft) 170, and the like. Steering torque sensor 120 and reducer 160 are disposed in a steering column 180 that accommodates steering shaft 170.

A pinion gear 171 is provided at the tip end of steering shaft 170. Along with the rotation of pinion gear 171, a rack gear 172 is horizontally moved to the left or right as viewed in the travel direction of vehicle 200. A steering mechanism 202 for a wheel 201 is provided at the opposite ends of rack gear 172. Along with the horizontal movement of rack gear 172, wheel 201 can change its direction.

Steering torque sensor 120 detects a steering torque of steering shaft 170 generated as a driver steers the vehicle, and then outputs a signal ST indicating the detected steering torque to electronic control unit 150. Electronic control unit 150 includes a microcomputer, inverters for driving electric motor 130, inverter drive circuits, etc. and receives information about a state variable for determining a steering assist force such as a steering torque signal ST and a vehicle speed signal VSP output from a vehicle speed sensor 190.

When receiving steering torque signal ST, vehicle speed signal VSP, or the like, electronic control unit 150 executes pulse width modulation (PWM) control on energization to electric motor 130 based on the driving condition of a vehicle indicated by these signals, thereby controlling the torque generated in electric motor 130, i.e., steering assist force. In this way, electronic control unit 150 constitutes a drive controller for electric motor 130. Regarding the inverters and the inverter drive circuits disposed in electronic control unit 150, the inverters or both of the inverters and the inverter drive circuits can be provided independently outside electronic control unit 150. In this case, electronic control unit 150 constitutes, together with the external inverters or both the external inverters and inverter drive circuits, the drive controller for electric motor 130.

Figure 2:
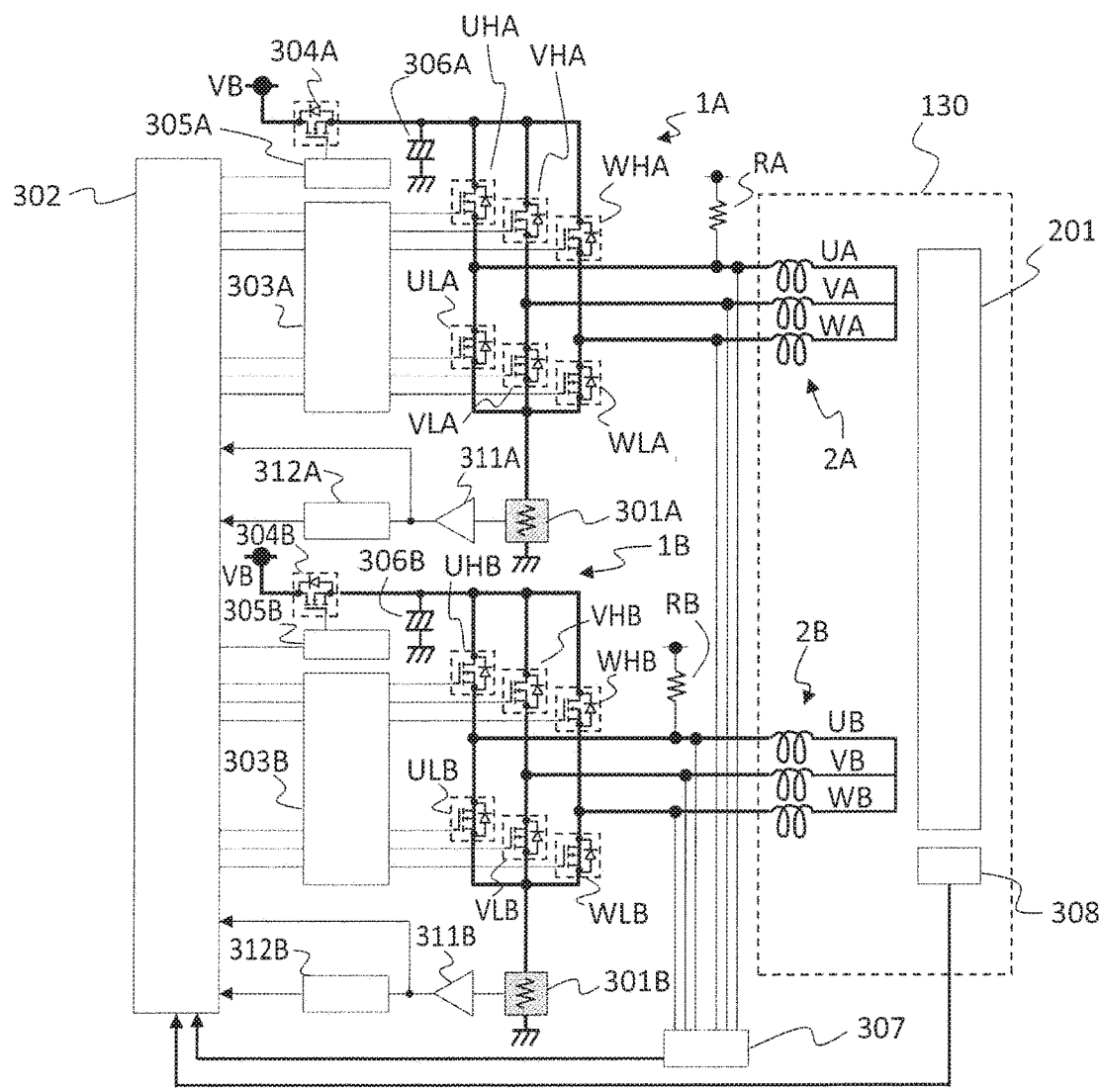
FIG. 2 is a circuit diagram of the controller according to the embodiment of the present invention.

FIG. 2 illustrates an example of the circuit configuration of electronic control unit 150 and electric motor 130. Electric motor 130 of FIG. 2 is a three-phase synchronous electric motor composed of a first coil set 2A of star-connected three-phase coils UA, VA, and WA and a second coil set 2B of star-connected three-phase coils UB, VB, and WB. In first coil set 2A and second coil set 2B, a connection point among three-phase coils U, V, and W is a neutral point.

First coil set 2A and second coil set 2B are disposed in an unillustrated cylindrical stator and a permanent magnet rotor 201 is rotatably provided inside a space formed at the center of the stator. First coil set 2A and second coil set 2B share a magnetic circuit. Moreover, first coil set 2A is directly connected to a first inverter 1A, and second coil set 2B is directly connected to a second inverter 1B. First inverter 1A supplies power to first coil set 2A, and second inverter 1B supplies power to second coil set 2B.

First inverter 1A is configured by a three-phase bridge circuit including three pairs of semiconductor switches UHA, ULA, VHA, VLA, WHA, and WLA for driving each of a U-phase coil UA, a V-phase coil VA, and a W-phase coil WA of first coil set 2A. Moreover, second inverter 1B is configured by a three-phase bridge circuit including three pairs of semiconductor switches UHB, ULB, VHB, VLB, WHB, and WLB for driving a U-phase coil UB, a V-phase coil VB, and a W-phase coil WB of second coil set 2B.

In this embodiment, the semiconductor switches constituting first inverter 1A and second inverter 1B are N-channel MOSFETs. In first inverter 1A and second inverter 1B, semiconductor switches UH and UL have series-connected drain and source between a power supply VB and the ground point, and a connection point between semiconductor switches UH and UL is connected to U-phase coil U.

Furthermore, in first inverter 1A and second inverter 1B, semiconductor switches VH and VL have series-connected drain and source between power supply VB and the ground point, and a connection point between semiconductor switches VH and VL is connected to V-phase coil V. Moreover, in first inverter 1A and second inverter 1B, semiconductor switches WH and WL have series-connected drain and source between power supply VB and the ground point, and a connection point between semiconductor switches WH and WL is connected to W-phase coil W. Note that connection points between semiconductor switches UH and UL, between semiconductor switches VH and VL, and between semiconductor switches WH and WL serve as output points of the inverters.

A first drive circuit 303A functions to drive the semiconductor switches constituting first inverter 1A, and includes three high-potential side drivers for respectively driving semiconductor switches VHA, UHA, and WHA as high-potential side switching elements in first inverter 1A, and three low-potential side drivers for respectively driving semiconductor switches VLA, ULA, and WLA as low-potential side switching elements in first inverter 1A.

Furthermore, a second drive circuit 303B functions to drive the semiconductor switches constituting second inverter 1B, and includes three high-potential side drivers for respectively driving semiconductor switches VHB, UHB, and WHB as high-potential side switching elements in second inverter 1B, and three low-potential side drivers for respectively driving semiconductor switches VLB, ULB, and WLB as low-potential side switching elements in second inverter 1B. Note that the high-potential side switching element can be referred to as "upstream drive element" or "upper arm". The low-potential side switching element can be referred to as "downstream drive element" or "lower arm".

First drive circuit 303A and second drive circuit 303B drive the semiconductor switches constituting inverters 1A and 1B, respectively according to a command signal from a microcomputer 302. As described above, the controller for an electric motor of this embodiment incorporates two energization systems: a first energization system including first coil set 2A and first inverter 1A and a second energization system including second coil set 2B and second inverter 1B. Note that the first energization system can be referred to as a "first channel ch1" and the second energization system can be referred to as a "second channel ch2".

A power supply relay 304A is provided between power supply VB and first inverter 1A in order to interrupt the power supply to first inverter 1A, and a power supply relay 304B is provided between power supply VB and second inverter 1B in order to interrupt the power supply to second inverter 1B. In this embodiment, power supply relays 304A and 304B are configured by semiconductor switches. The semiconductor switches constituting power supply relays 304A and 304B are driven by drive circuits 305A and 305B. As power supply relays 304A and 304B, electromagnetic relays, each of which provides electrical switching by physically moving its contact point, may be alternatively used.

Drive circuits 305A and 305B of power supply relays 304A and 304B drive the semiconductor switches constituting power supply relays 304A and 304B according to a command signal from microcomputer 302. To be specific, microcomputer 302 can independently interrupt power supply to first inverter 1A and that to second inverter 1B. Furthermore, in order to reduce fluctuations in power supply voltage to inverters 1A and 1B, capacitors 306A and 306B are provided. Specifically, capacitor 306A connects, to the ground point, the power supply line between power supply relay 304A and inverter 1A, whereas capacitor 306B connects, to the ground point, the power supply line between power supply relay 304B and inverter 1B.

Also, there is provided a voltage monitor circuit 307 for detecting coil-end voltage in coil set 2A and coil-end voltage in coil set 2B. Voltage monitor circuit 307 outputs, to microcomputer 302, signals indicating detected coil-end voltages in coil sets 2A and 2B. In addition, to keep the coil-end potential in coil set 2A fixed even when all the switching elements in inverter 1A are turned OFF, a pull-up resister RA for pulling up U-phase coil UA in coil set 2A is provided. To keep the coil-end potentials in coil set 2B fixed even when all the switching elements in inverter 1B are turned OFF, a pull-up resister RB for pulling up U-phase coil UB in coil set 2B is provided. An angle sensor 308 detects the angle of rotor 201, and outputs a signal indicating the detected angle to microcomputer 302.

Moreover, there are provided current sensors 301A and 301B for detecting drive current (motor current) of electric motor 130 are connected between the ground point and sources of low-potential side semiconductor switches UL, VL, and WL in first inverter 1A and second inverter 1B, respectively. Note that current sensors 301A and 301B can be also referred to as "current detection resistors", "current detection means", or "current detection devices". Amplifier circuits 311A and 311B receive outputs from current sensors 301A and 301B. Microcomputer 302 and peak-hold circuits 312A and 312B receive outputs from amplifier circuits 311A and 311B. Microcomputer 302 receives outputs from peak-hold circuits 312A and 312B. That is, microcomputer 302 receives detection values of motor drive current at each energization system as well as a peak value of the detected motor drive current.

Figure 3:
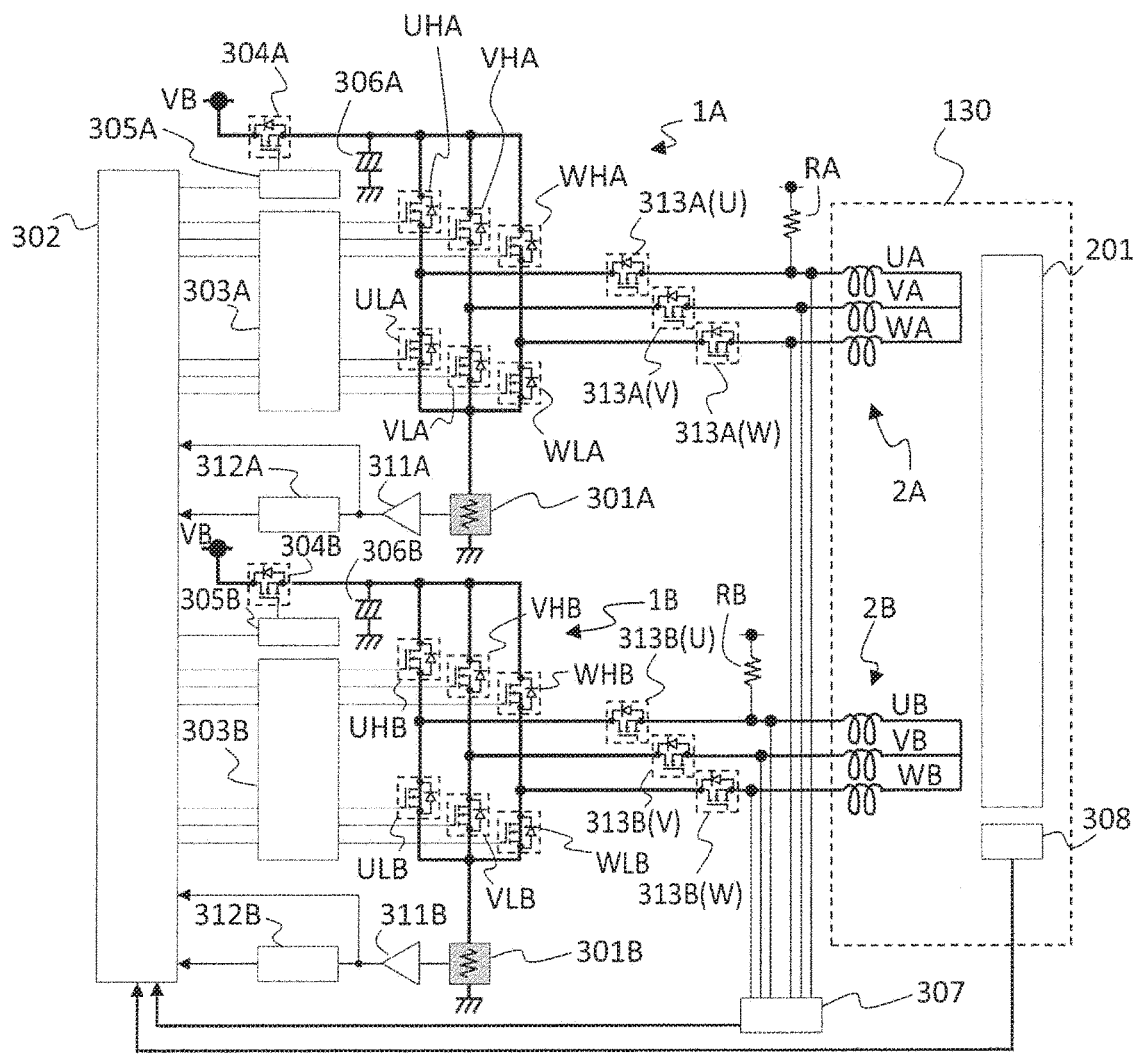
FIG. 3 is a circuit diagram of the controller according to the embodiment of the present invention.

Note that as illustrated in FIG. 3, phase relays 313A(U), 313A(V), and 313A(W) can be disposed on phase lines connecting between an output point of first inverter 1A and three-phase coils UA, VA, and WA. Likewise, phase relays 313B(U), 313B(V), and 313B(W) can be disposed on phase lines connecting between an output point of second inverter 1B and three-phase coils UB, VB, and WB. Here, the phase line can be referred to as "drive line" or "energization line".

Figure 4:
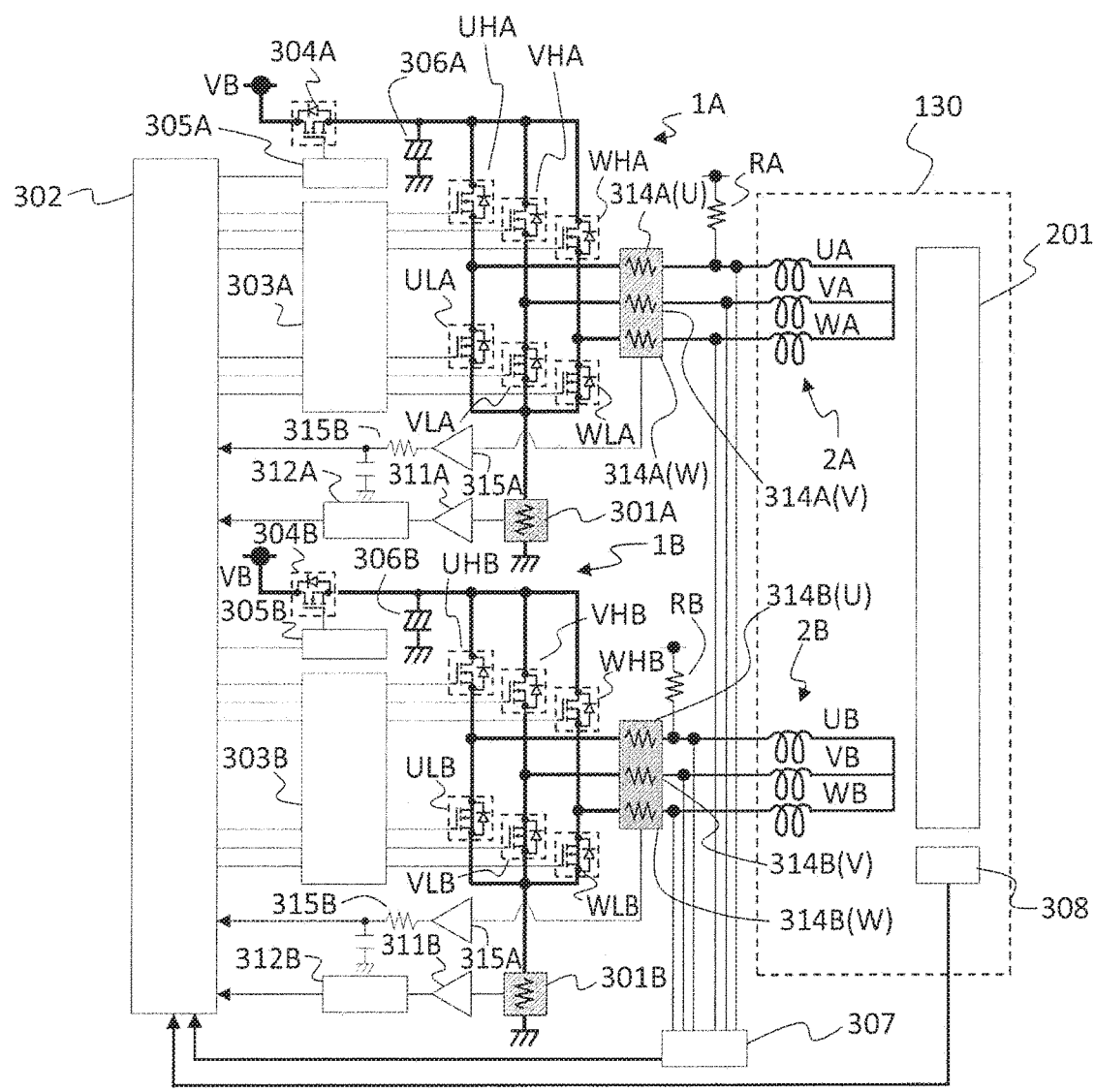
FIG. 4 is a circuit diagram of the controller according to the embodiment of the present invention.

In addition, as illustrated in FIG. 4, there provide, together with current sensors 301A and 301B, phase current sensors 314A(U), 314A(V), 314A(W), 314B(U), 314B(V), and 314B(W) for detecting phase current flowing through each of three-phase coils U, V, and W. In FIG. 4, phase current sensors 314A(U), 314A(V), and 314A(W) are provided on phase lines connecting between an output point of first inverter 1A and three-phase coils UA, VA, and WA, and phase current sensors 314B(U), 314B(V), and 314B(W) are provided on phase lines connecting between an output point of second inverter 1B and three-phase coils UB, VB, and WB.

Figure 5:
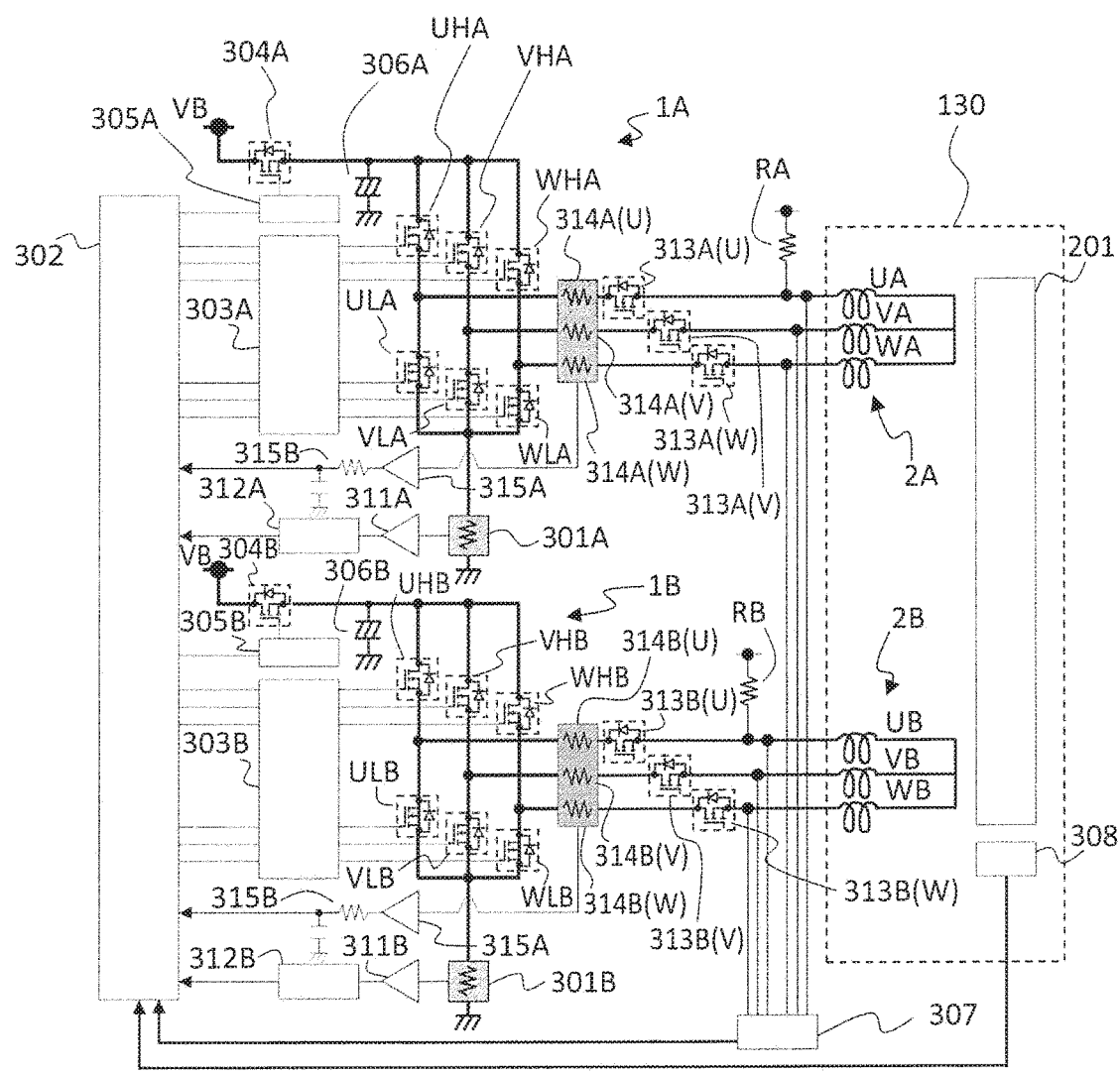
FIG. 5 is a circuit diagram of the controller according to the embodiment of the present invention.

Moreover, as illustrated in FIG. 5, phase relays 313 and phase current sensors 314 can be provided on phase lines connecting between output points of inverter 1A and three-phase coils U, V, and W and phase lines connecting between output points of inverter 1B and three-phase coils U, V, and W. In the illustrated example of FIG. 5, phase current sensors 314 are provided on phase lines connecting between output points of inverters 1A and 1B and three-phase coils U, V, and W. In addition, phase relays 313 are provided between phase current sensors 314 and the coils.

Phase relays 313A(U), 313A(V), 313A(W), 313B(U), 313B(V), and 313B(W) of FIGS. 3 and 5 are composed of semiconductor switches such as N-channel MOSFETs and controlled into ON/OFF state by microcomputer 302. Moreover, microcomputer 302 receives outputs from phase current sensors 314A(U), 314A(V), 314A(W), 314B(U), 314B (V), and 314B(W) of FIGS. 4 and 5. On each line connecting between phase current sensors 314 and microcomputer 302, provided are amplifier circuit 315A, and a low pass filter circuit 315B including a resistor R connected in series with a capacitor C parallel to the output of each phase current sensor 314.

Figure 6:
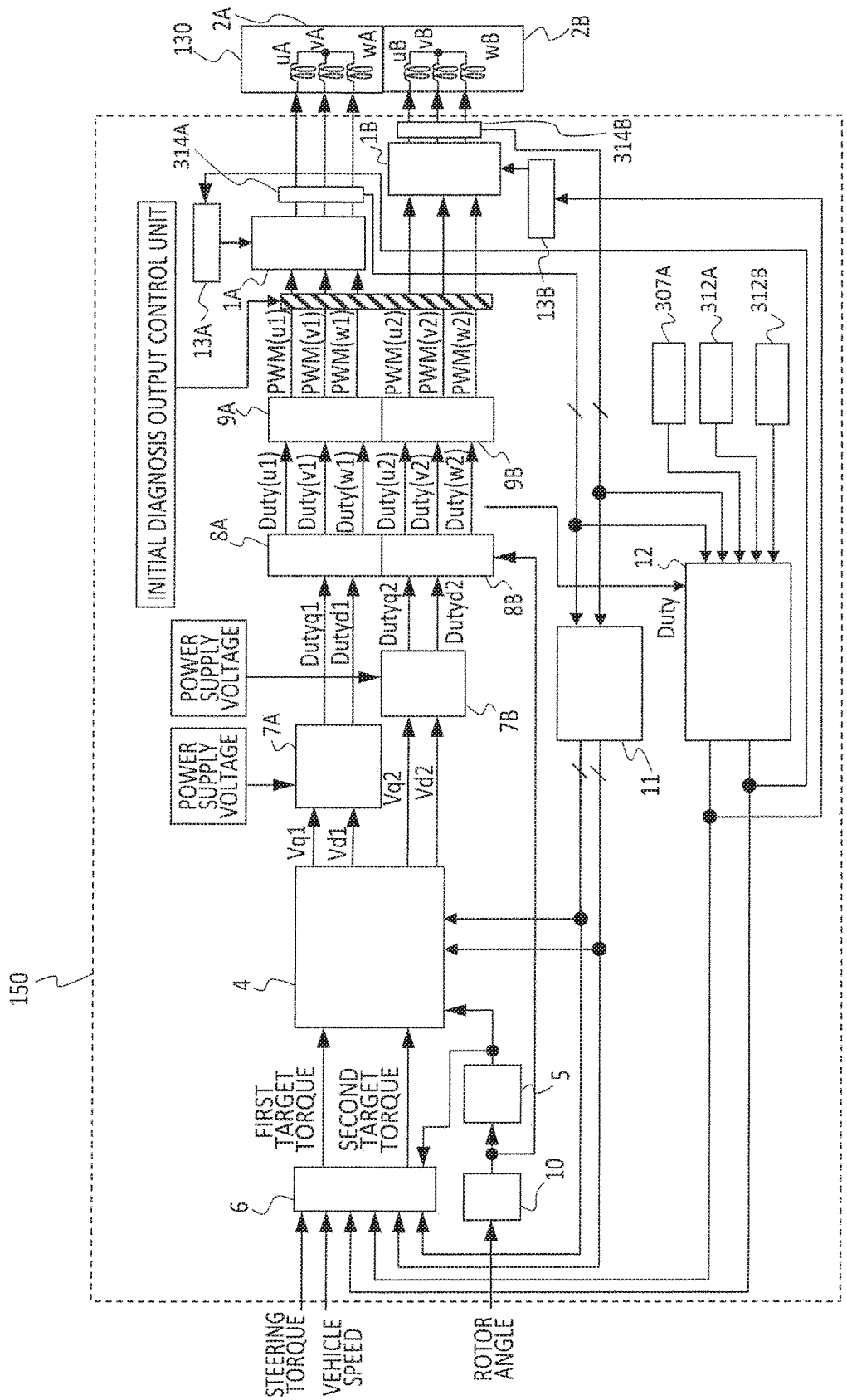
FIG. 6 is a functional block diagram of the controller according to the embodiment of the present invention.
Figure 7:
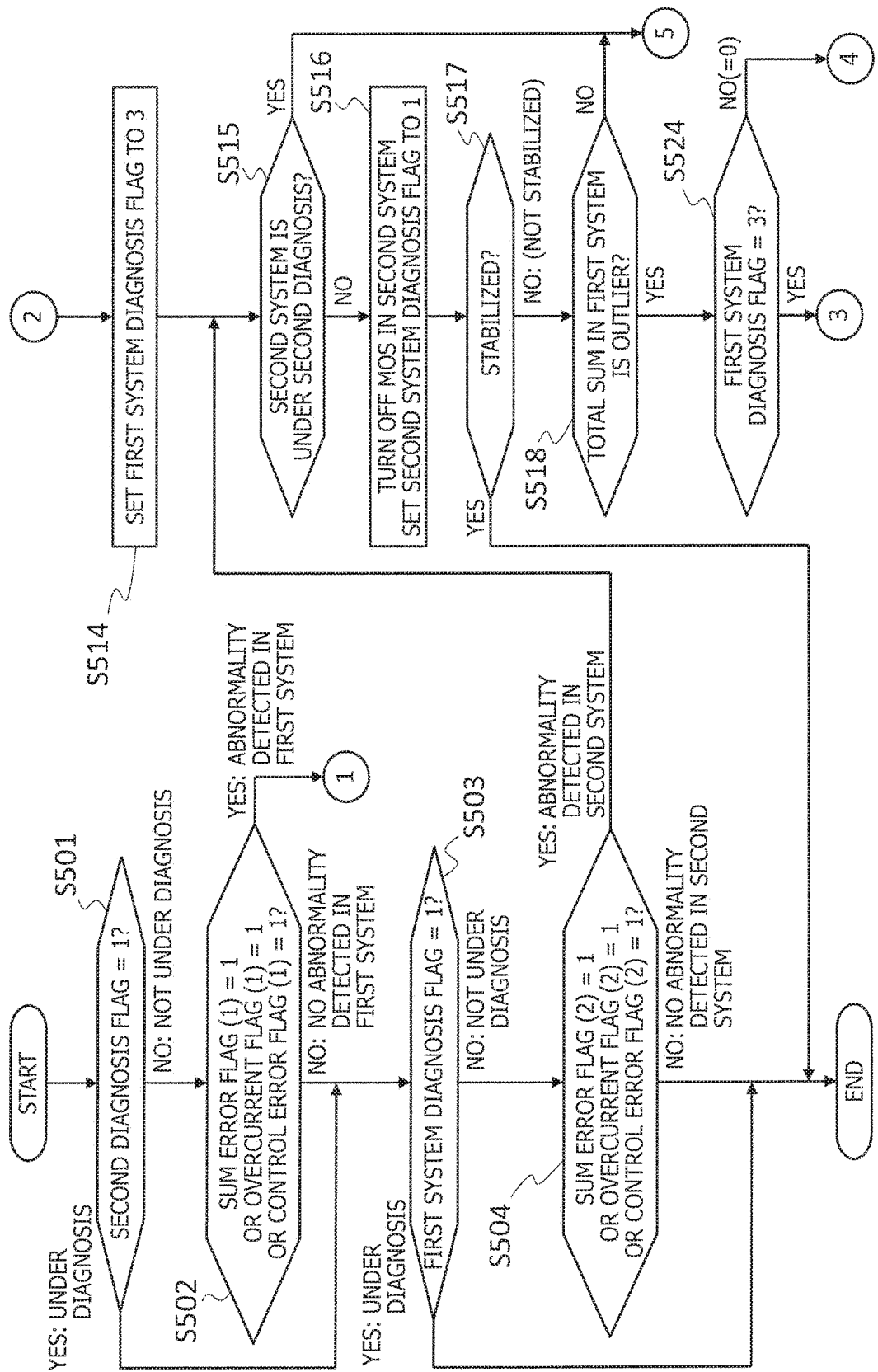
FIG. 7 is a flowchart illustrating the procedure of diagnosis processing according to the embodiment of the present invention.
Figure 8:
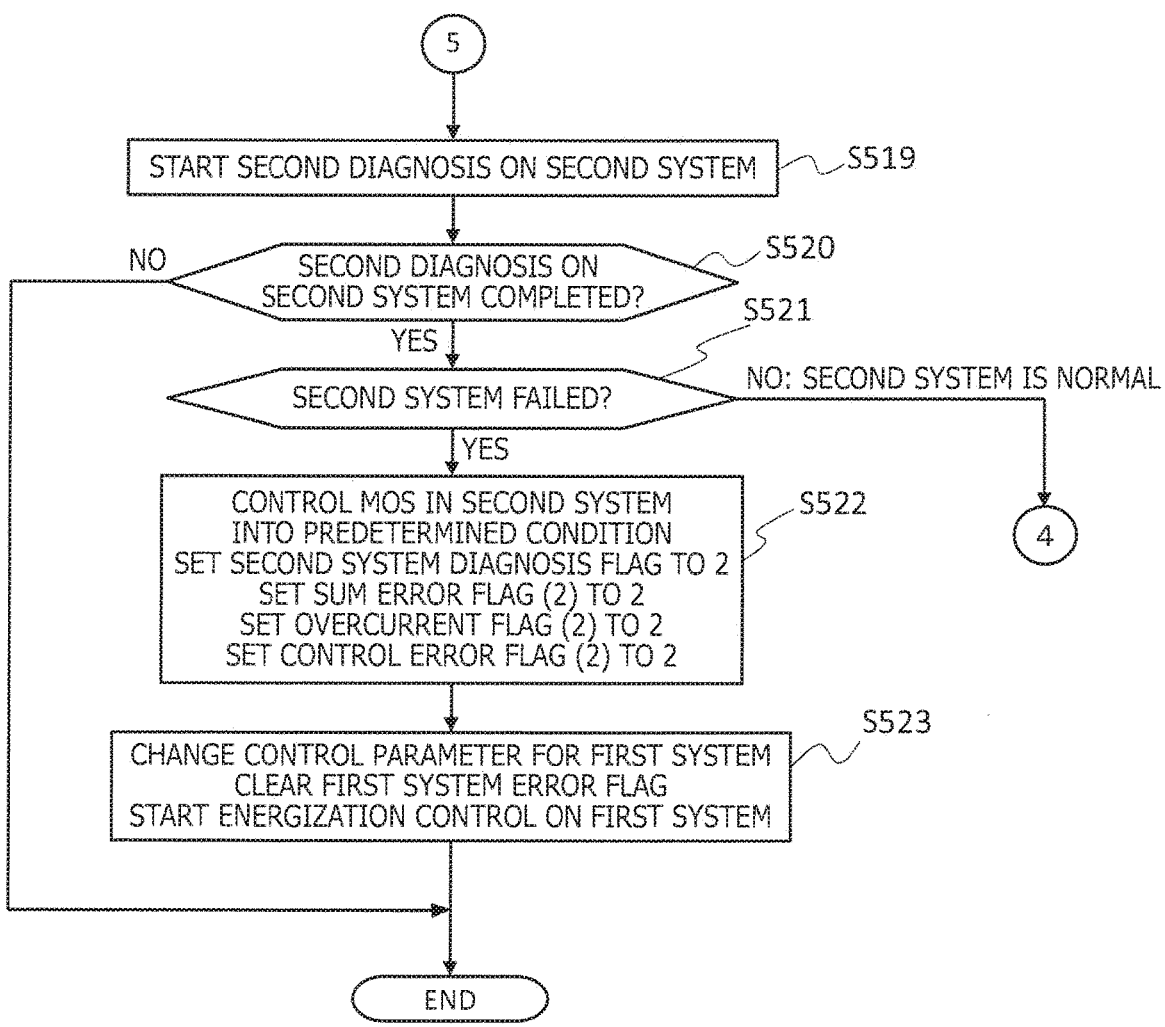
FIG. 8 is a flowchart illustrating the procedure of diagnosis processing according to the embodiment of the present invention.
Figure 9:
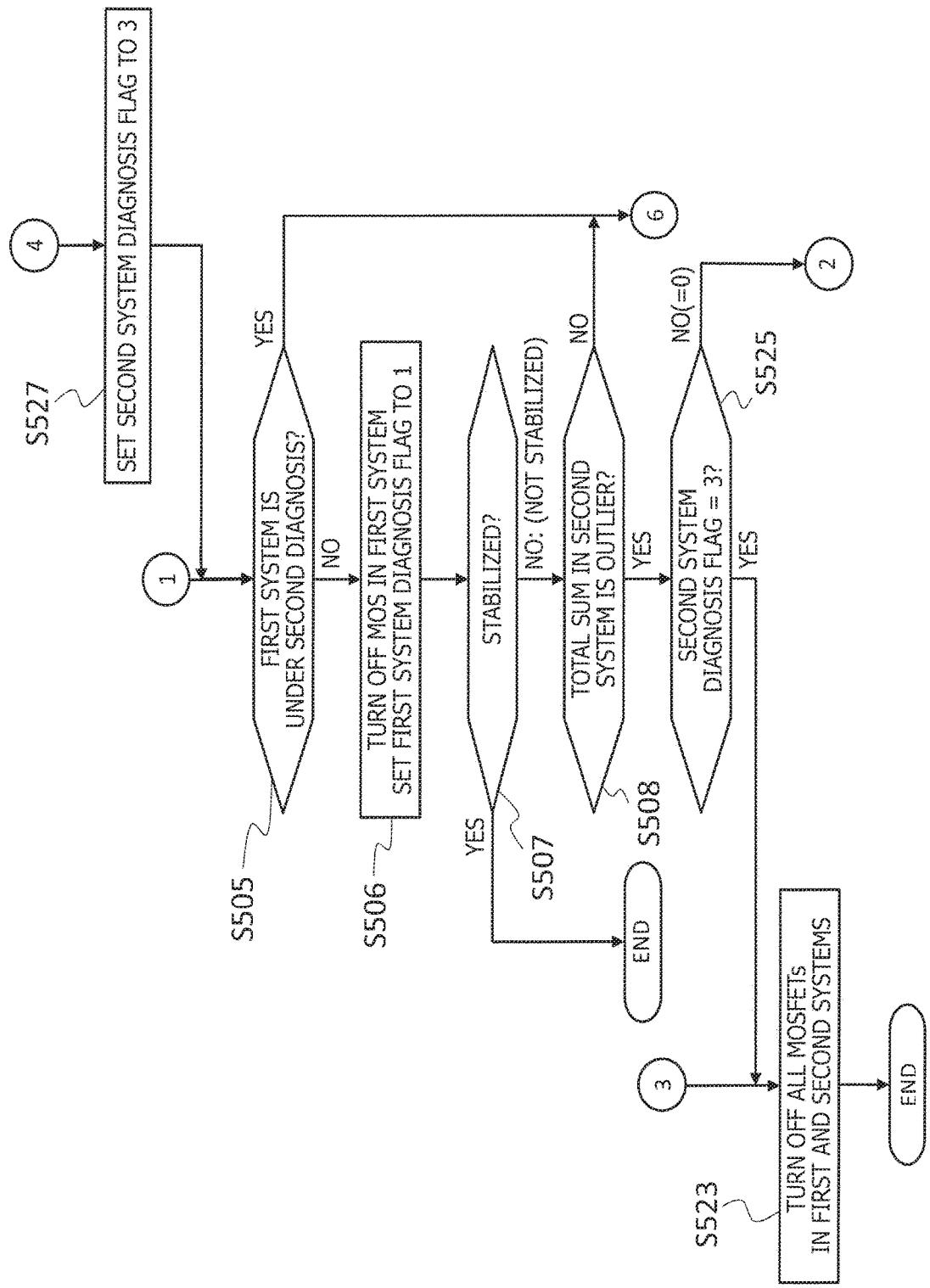
FIG. 9 is a flowchart illustrating the procedure of diagnosis processing according to the embodiment of the present invention.
Figure 10:
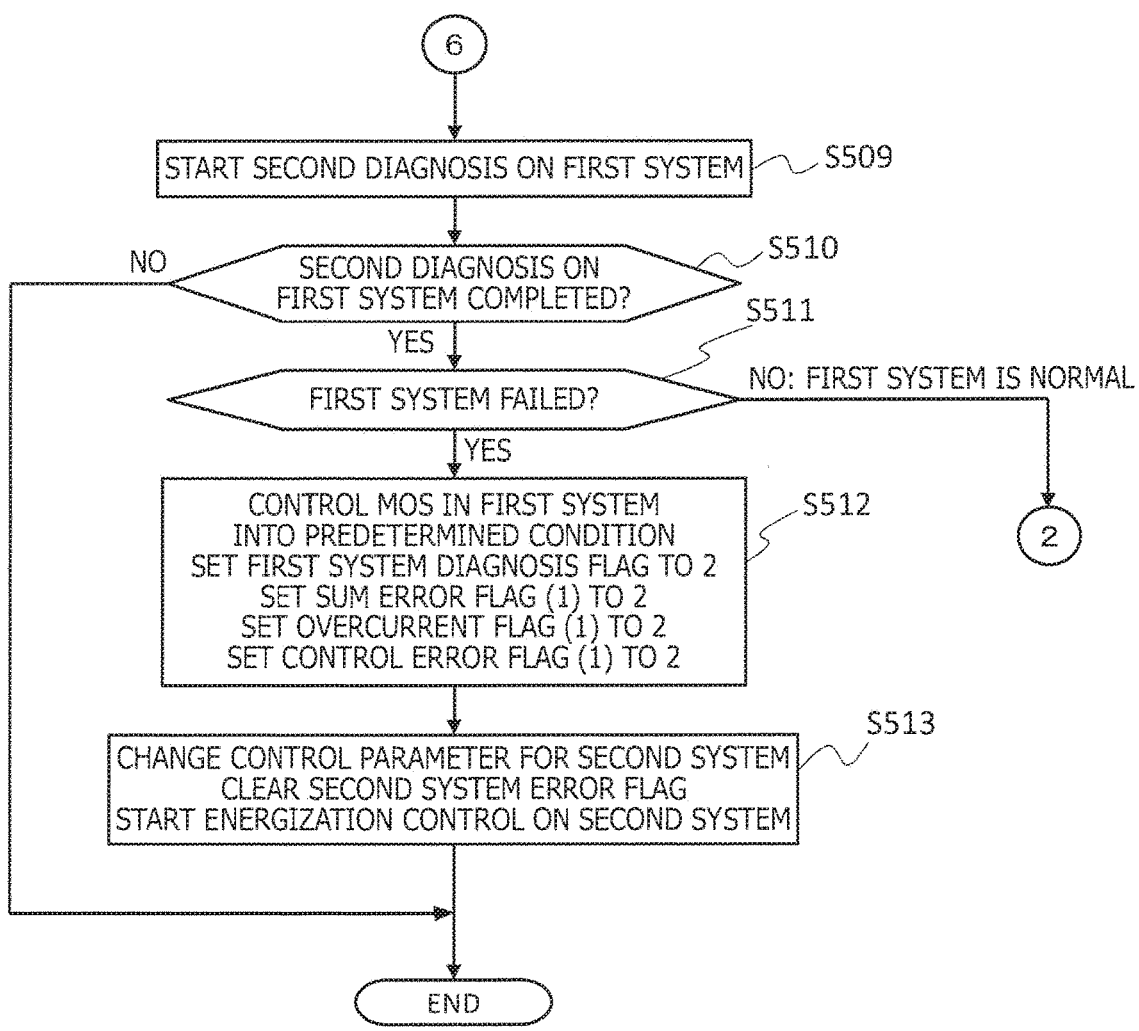
FIG. 10 is a flowchart illustrating the procedure of diagnosis processing according to the embodiment of the present invention.

FIG. 6 is a functional block diagram illustrating an example of the function of controlling inverters 1A and 1B, which is implemented by microcomputer 302. A target value calculating unit 6 calculates a target assist torque, i.e., a target value of an output torque of electric motor 130 based on steering conditions such as a steering torque, the vehicle speed, and the rotational speed of electric motor 130. In this example, target value calculating unit 6 individually sets a target assist torque for the first energization system and that for the second energization system, aiming at generating a target steering force corresponding to the total sum of a motor torque generated through energization control over the first energization system and that generated through energization control over the second energization system.

An angle calculating unit 10 receives a signal from angle sensor 308 and then calculates the angle of rotor 201 of electric motor 130. A motor rotational speed calculating unit 5 calculates the rotational speed (rpm) of electric motor 130 based on information about the calculated angle of rotor 201 from angle calculating unit 10 and then outputs a signal indicating the calculated motor rotational speed to an output voltage calculating unit 4 and target value calculating unit 6.

Output voltage calculating unit 4 receives data about a target assist torque in each energization system, data about the rotational speed of electric motor 130, and a d-axis actual current value $I_d$ and a q-axis actual current value $I_q$ at each energization system, both of which are calculated by a three-to-two phase converting unit 11. Output voltage calculating unit 4 calculates a d-axis voltage command value $V_d1$ and a q-axis voltage command value $V_q1$ of first inverter 1A and a d-axis voltage command value $V_d2$ and a q-axis voltage command value $V_q2$ of a second inverter 1B, and then outputs the calculated values.

Three-to-two phase converting unit 11 calculates a d-axis actual current value $I_d1$ and a q-axis actual current value $I_q1$ of the first energization system based on output signals from current sensors 314A(U), 314A(V), and 314A(W), i.e., a detection value of actual current flowing through each phase in first coil set 2A. In addition, three-to-two phase converting unit 11 calculates a d-axis actual current value $I_d2$ and a q-axis actual current value $I_q2$ of the second energization system based on output signals from current sensors 314B (U), 314B(V), and 314B(W), i.e., a detection value of actual current flowing through each phase in second coil set 2B.

Three-to-two phase converting unit 11 outputs data about d-axis actual current value $I_d1$ and q-axis actual current value $I_q1$ of the first energization system and data about d-axis actual current value $I_d2$ and q-axis actual current value $I_q2$ of the second energization system to output voltage calculating unit 4 and target value calculating unit 6, respectively. Then, d-axis voltage command value $V_d1$ and q-axis voltage command value $V_q1$ output from output voltage calculating unit 4 are input to a first output duty calculating unit 7A.

First output duty calculating unit 7A calculates a d-axis duty Dutyd1 and a q-axis duty Dutyq1 of first inverter 1A in PWM control, based on d-axis voltage command value $V_d1$, q-axis voltage command value $V_q1$, and the power supply voltage of first inverter 1A. Furthermore, d-axis voltage command value $V_d2$ and q-axis voltage command value $V_q2$ output form output voltage calculating unit 4 are input to a second output duty calculating unit 7B.

Second output duty calculating unit 7B calculates a d-axis duty Dutyd2 and a q-axis duty Dutyq2 of second inverter 1B in PWM control based on d-axis voltage command value $V_d2$, q-axis voltage command value $V_q2$, and the power supply voltage of second inverter 1B. First two-to-three phase converting unit 8A receives d-axis duty Dutyd1 and q-axis duty Dutyq1 output from first output duty calculating unit 7A and also information about the rotor angle in electric motor 130. First two-to-three phase converting unit 8A calculates, based on these, duty command values DutyU1, DutyV1, and DutyW1 of three phases in first coil set 2A, and then outputs the calculated values.

In addition, a second two-to-three phase converting unit 8B receives d-axis duty Dutyd2 and q-axis duty Dutyq2 output from second output duty calculating unit 7B and also information about the rotor angle in electric motor 130. Second two-to-three phase converting unit 8B calculates, based on these, duty command values DutyU2, DutyV2, and DutyW2 of three phases in second coil set 2B, and then outputs the calculated values. A first dead time compensation unit 9A receives duty command values DutyU1, DutyV1, and DutyW1 output from first two-to-three phase converting unit 8A. First dead time compensation unit 9A compensates for the dead time thereof to obtain, by calculation, duty command values DutyU1, DutyV1, and DutyW1 and then outputs the calculated values to first inverter 1A.

In addition, a second dead time compensation unit 9B receives the duty command values DutyU2, DutyV2, and DutyW2 output from second two-to-three phase converting unit 8B. Second dead time compensation unit 9B compensates for the dead time thereof to obtain, by calculation, duty command values DutyU2, DutyV2, and DutyW2, and outputs the calculated values to second inverter 1B. The dead time compensation means the processing for holding down a voltage drop etc. that will occur with a dead time voltage at the time of PWM control for retarding, by the dead time, the rising edge of a PWM signal as obtained by comparing a triangular wave with a command value to thereby generate a gate signal of the switching element so as not to cause a short-circuit between upper and lower arms of inverters 1A and 1B.

A determination unit 12 receives outputs from phase current sensors 314A(U), 314A(V), 314A(W), 314B(U), 314B(V), and 314B(W), outputs from peak-hold circuits 312A and 312B, an output from voltage monitor circuit 307, duty command values DutyU1, DutyV1, and DutyW1 at three phases of first coil set 2A, duty command values DutyU2, DutyV2, and DutyW2 at three phases of second coil set 2B, and the like. Then, determination unit 12 makes a fault diagnosis on each energization system based on these input signals and hereby controls outputting an OFF command signal for the first energization system and an OFF command signal for the second energization system according to the fault diagnosis.

The OFF command signal for the first energization system output from determination unit 12 is input to a first ON/OFF control unit 13A. After receiving the OFF command signal, first ON/OFF control unit 13A turns OFF all the switching elements in first inverter 1A, hereby stopping operations of first inverter 1A, i.e., current output thereof. Likewise, the OFF command signal for the second energization system output from determination unit 12 are input to second ON/OFF control unit 13B. After receiving the OFF command signal, second ON/OFF control unit 13B turns OFF all switching elements in second inverter 1B, hereby stopping operations of second inverter 1B, i.e., current output thereof.

Furthermore, the OFF command signal for the first energization system and the OFF command signal for the second energization system, which are output from determination unit 12 are input to target value calculating unit 6. Then, target value calculating unit 6 calculates a target assist torque at each energization system according to OFF command signal(s) for first inverter 1A and/or second inverter 1B output from determination unit 12, that is, whether to operate both or either of the first energization system and the second energization system.

Referring to flowcharts of FIGS. 7 to 10, the processing function of determination unit 12 is described next. The routines in the flowcharts of FIGS. 7 to 10 are executed by microcomputer 302 interruptedly at a predetermined time interval. The predetermined time interval may be, for example, about 1 ms.

First, in step S501, microcomputer 302 determines whether a second system diagnosis flag is set to 1. This flag is set when the second energization system is under the second diagnosis processing. If the second system diagnosis flag and a first system diagnosis flag (as described later) are set to "0", it indicates that second diagnosis processing is not yet started; if "1", the second diagnosis processing is being executed; if "2", the second diagnosis processing confirms that the energization system has any abnormality; and if "3", the processing for confirming the result of detecting any abnormality is suspended.

Provided that the second system diagnosis flag=0, which indicates that the second diagnosis processing is not yet started on the second energization system, microcomputer 302 proceeds to step S502 to determine the result of the first diagnosis processing on the first energization system. As described below, microcomputer 302 executes the first diagnosis processing on both the first energization system and the second energization system in an energized state, and executes the second diagnosis processing thereon in an unenergized state so as to determine the determination result in the first diagnosis processing. If the second diagnosis processing is not executed on the second energization system, the determination result in the first diagnosis processing on the first energization system is determined.

Microcomputer 302 makes, as the first diagnosis processing, a diagnosis as to whether the total sum of current detection values at three phases is an outlier, whether overcurrent occurs such that a motor current value exceeds a threshold, whether any abnormality occurs in energization control, and the like under the PWM control of the switching element in the inverter. More specifically, if an absolute value of the total sum of phase current detection values at any energization system exceeds a threshold (threshold>0) for a set time, microcomputer 302 determines that any abnormality occurs in the energization system concerned and then sets a sum error flag to 1. That is, if the total sum of phase current detection values approximates zero, microcomputer 302 determines that the energization system is normal, whereas if the total sum deviates from a normal range around zero, it determines that the energization system is failed.

Moreover, if a peak value of motor current at any energization system exceeds a preset current value for a predetermined time, microcomputer 302 determines that overcurrent occurs in the energization system concerned and then sets an overcurrent flag to 1. In other words, if the peak current of the motor current is held higher than the maximum allowable value, microcomputer 302 determines that an abnormality such as overshoot appears in energization current.

Moreover, if an absolute value of the difference between a phase current detection value and a phase current estimated value as estimated from an output duty ratio of PWM control exceeds a predetermined current value in any energization system for a predetermined time, microcomputer 302 determines that an abnormality occurs in energization control on the energization system concerned and then sets a control error flag to 1. In other words, if the control deviation exceeds an allowable error under the condition that current does not flow into each phase in an amount corresponding to a set duty ratio, microcomputer 302 determines that any abnormality occurs in energization control on the energization system.

As described above, in the first diagnosis processing, the individual energization systems are diagnosed as to any abnormality, but a factor of the abnormality is not identified. In step S502, if the sum error flag (1), the overcurrent flag (1), and the control error flag (1), which indicate results of the first diagnosis processing, are all set to 0, and no abnormality is found in the first energization system through the first diagnosis processing, microcomputer 302 proceeds to step S503.

In step S503, microcomputer 302 determines whether the first system diagnosis flag is set to 1, which indicates that the first energization system is under the second diagnosis processing. If the first system diagnosis flag=0, indicating that the second diagnosis processing is not yet started on the first energization system, microcomputer 302 proceeds to step S504 to determine a result of the first diagnosis processing on the second energization system.

To be specific, microcomputer 302 determines, in step S504, whether all of the sum error flag (2), the overcurrent flag (2), and the control error flag (2) are set to 0 or whether at least one of them is set to 1. These flags indicate results of the first diagnosis processing on the second energization system. If all of the sum error flag (2), the overcurrent flag (2), and the control error flag (2) are set to 0, that is, no abnormality is found in the second energization system through the first diagnosis processing, microcomputer 302 ends this routine at this point.

For example, if the first energization system involves at least one of the outlier in the total sum of current detection values at three phases, the overcurrent, and an abnormality in energization control, by which at least one of the sum error flag (1), the overcurrent flag (1), and the control error flag (1) is set to 1, microcomputer 302 proceeds from step S502 to step S505. In step S505, microcomputer 302 determines whether the first energization system having any abnormality detected through the first diagnosis processing is being under the second diagnosis processing as diagnosis processing for identifying a failed portion.

At the time when any fault is detected in the first energization system through the first diagnosis processing, if the second diagnosis processing is not executed, microcomputer 302 proceeds from step S505 to step S506. In step S506, microcomputer 302 stops the PWM control of inverter 1A in the first energization system so as to execute the second diagnosis processing. Then, the microcomputer executes processing for locking all the switching elements in inverter 1A into OFF state, that is, for controlling the first energization system into an unenergized state as well as processing for setting the first system diagnosis flag to 1.

Next, microcomputer 302 proceeds to step S507 to determine whether a predetermined time has elapsed from when the PWM control over first inverter 1A of the first energization system is stopped, that is, all the switching elements in first inverter 1A are locked into OFF state. The predetermined time in step S507 is previously adjusted according to the time from when all the switching elements in first inverter 1A are locked to OFF state until when all the switching elements in first inverter 1A actually stabilize in OFF state.

According to the predetermined time, if the predetermined time has elapsed from when all the switching elements in first inverter 1A are locked to OFF state, it is presumable that all the switching elements in first inverter 1A actually stabilize in OFF state. If the predetermined time has not yet elapsed from when all the switching elements in first inverter 1A are locked to OFF state, that is, if microcomputer 302 is put on standby, waiting for the elements to stabilize in OFF state, the microcomputer ends this routine at step S507 and waits for a while before proceeding to the next step.

Owing to the above settings, there is little likelihood that the diagnosis processing is executed before the switching elements in first inverter 1A can actually stabilize in OFF state, resulting in an erroneous detection of any abnormality. For example, in case the first energization system and the second energization system are short-circuited, if all switching elements of the inverter in either energization system are controlled into OFF state, no current flows in and out through the short-circuited path and thus, current flowing in each phase of the other energization system resumes a normal value. Under the condition that the elements do not stabilized in OFF state just after the inverter is turned OFF, the current flowing in and out through the short-circuited path still influences the current in each phase of the other energization system, whereby a current detection value might be an outlier.

To overcome it, microcomputer 302 waits for some time after controlling into OFF state all the switching elements in the energization system with any abnormality being detected through the first diagnosis processing until all the switching elements actually stabilize in OFF state. After that, the microcomputer proceeds to step S508 and subsequent steps. Then, after the predetermined time has elapsed from when all the switching elements of inverter 1A are locked to OFF state, microcomputer 302 proceeds from step S507 to step S508.

In step S508, microcomputer 302 determines whether an absolute value of the total sum of current detection values at three phases in the second energization system exceeds a threshold for the predetermined time or more. Then, if an absolute value of the total sum of current detection values at three phases in the second energization system does not exceed a threshold or if the absolute value, although exceeding the threshold, is not kept higher than the threshold for the predetermined time, microcomputer 302 proceeds to step S509 to start the second diagnosis processing as a diagnosis for identifying a failed portion of the first energization system.

Proceeding from step S506 to step S509, microcomputer 302 executes the second diagnosis processing on the first energization system in step S509 under the condition that all the switching elements in inverter 1A are turned OFF, i.e., under the unenergized control on the first energization system. Microcomputer 302 executes, as second diagnosis processing, diagnoses as to a short-circuit between the energization systems, a short-to-supply and a short-to-ground, disconnection of an energization line, a functional error in detecting a phase current, and a functional error in finding a peak value of motor current.

Microcomputer 302 switches to High or Low an output voltage to be fed to one phase in the coil set in the first energization system having any abnormality detected. If such phase output control influences the detection value of phase current in the second energization system or the total sum of current detection values at three phases in the second energization system, the microcomputer detects the occurrence of a short-circuit between the systems. Here, microcomputer 302 switchingly choses one phase the output voltage to which is switched to High or Low. If controlling the output voltage at each of the three phases does not influence the phase current in the second energization system, the microcomputer determines that no short-circuit occurs between the energization systems.

Here, the diagnosis processing as to a short-to-supply and a short-to-ground is to detect the occurrences of a short-to-supply as a short-circuit between the power supply and the coil in the first energization system having any abnormality detected and a short-to-ground as a short-circuit between the ground point and the coil in the first energization system having any abnormality detected. Note that the short-to-supply includes a short-circuit between the power supply and the drive line of each coil and a short-circuit in any high-potential side switching element. The short-to-ground includes a short-circuit between the ground point and the drive line of each coil and a short-circuit in any low-potential side switching element.

Microcomputer 302 makes a diagnosis as to whether a short-circuit occurs in any high-potential side switching element or low-potential side switching element based on each coil end voltage under the condition that power supply relays 304A and 304B are turned ON and all the switching elements constituting inverters 1A and 1B are controlled into OFF state. Furthermore, microcomputer 302 makes a diagnosis as to whether a short-circuit occurs between the drive line and the power supply or the ground point based on each coil end voltage under the condition that power supply relays 304A and 304B are turned OFF. More specifically, microcomputer 302 determines that a short-to-supply or a short-to-ground occurs if an additional value of coil end voltages at three phases as detected by voltage monitor circuit 307A deviates from a predetermined range based on a fixed potential obtained through a pull-up resistor RA.

The diagnosis processing as to the disconnection of any energization line is to determine whether disconnection occurs in the drive line of each coil in the first energization system having any abnormality detected. When the output voltage to one phase of the coil set in the first energization system having any abnormality detected is set to High or Low, if a detection value of output voltage to any other phase of the coil set in the first energization system does not reflect the High/Low control, microcomputer 302 determines that the energization line is disconnected. Microcomputer 302 switchingly choses one phase the output voltage to which is switched to High or Low. If a detection value of the output voltage to any other phase reflects the control on the output voltage at all three phases, the microcomputer determines that no drive line in the first energization system is disconnected.

The diagnosis processing as to the function of detecting a phase current is to determine whether any error occurs in the function of detecting currents in each phase of the first energization system, that is, whether any abnormality occurs in phase current sensor 314. If all the switching elements in first inverter 1A are turned OFF and the total sum of detection values of phase current at each coil exceeds a predetermined current value, microcomputer 302 determines that any fault occurs in phase current sensor 314A.

The diagnosis processing as to the function of detecting a peak value of motor current is to determine whether an error occurs in the function of detecting a peak value of motor current, i.e., whether any fault occurs in peak-hold circuit 312A. If all the switching elements in first inverter 1A are turned OFF and the detected peak value of motor current exceeds a predetermined current value, microcomputer 302 determines that an error occurs in the function of detecting the peak value of motor current, or determines that any fault occurs in peak-hold circuit 312A.

As described above, microcomputer 302 executes the second diagnosis processing as to a short-circuit between the energization systems, a short-to-supply, a short-to-ground, the disconnection of any energization line, an error in the function of detecting phase current, and an error in the function of detecting a peak value of motor current under the condition that the PWM control over first inverter 1A is stopped in the first energization system having any abnormality detected through the first diagnosis processing. Then, microcomputer 302 proceeds to step S510 to determine whether the second diagnosis processing is completed. If the second diagnosis processing is not completed, the microcomputer ends this routine at this point. Meanwhile, if the second diagnosis processing is completed, the microcomputer proceeds to step S511.

If the first energization system is under the second diagnosis processing, microcomputer 302 determines in step S501, that the second system diagnosis flag is not set to 1 and moreover, determines in step S502, that any abnormality is detected through the first diagnosis processing on the first energization system. If the total sum of current values in three phases of the second energization system is not an outlier, the microcomputer proceeds from step S505 to step S510. Then, in step S510, if determining that the second diagnosis processing on the first energization system is completed, the microcomputer proceeds to step S511.

In step S511, microcomputer 302 determines whether any fault is detected through the second diagnosis processing on the first energization system having any abnormality detected through the first diagnosis processing. If any fault is detected in the first energization system through the second diagnosis processing on the first energization system having any abnormality detected through the first diagnosis processing, microcomputer 302 proceeds to step S512.

In step S512, microcomputer 302 executes fail-safe processing that controls the switching element of first inverter 1A in the first energization system into a predetermined state. The microcomputer sets the first system diagnosis flag to "2", indicating that the detection of the abnormality in the first energization system is confirmed. In addition, the microcomputer sets the sum error flag (1), the overcurrent flag (1), and the control error flag (1) to "2", indicating that the detection of the abnormality is confirmed.

Next, microcomputer 302 proceeds to step S513 to change a control parameter for the second energization system depending on a failed portion of the first energization system and the control state of the switching element in the first energization system, and clears all of the sum error flag (2), the overcurrent flag (2), and the control error flag (2) of the second energization system to zero and then starts PWM control on second inverter 1B in the second energization system. In other words, if any abnormality is detected through the first diagnosis processing for the first energization system and also, any abnormality is detected through the second diagnosis processing for the first energization system, the microcomputer stops an output from first inverter 1A with the first energization system being unenergized, while executing energization control over the second energization system so as to drive electric motor 130 with an output from second inverter 1B.

Here, a description is given of an example of the fail-safe processing for controlling the switching element in first inverter 1A into a predetermined state in step S512. For example, if any abnormality is detected in the first energization system based on at least one of plural diagnoses out of the second diagnosis processing, microcomputer 302 keeps all the switching elements in first inverter 1A OFF, also without changing the current control parameter for operating the second energization system.

Meanwhile, if a short-circuit is detected through the second diagnosis processing, microcomputer 302 holds each switching element of first inverter 1A in ON or OFF state in a fail-safe mode, for example, as illustrated in FIGS. 11 to 14. Taking into consideration the reduction in apparent inductance, which will occur if the first energization system cancels out the magnetic flux in the second energization, microcomputer 302 changes the control parameter for the second energization system. Moreover, microcomputer 302 increases a target assist torque for the second energization system compared to the torque of when the first energization system is normal, so as to compensate for a braking torque resulting from loop current generated in the first energization system and for the magnetic flux cancelled out thereby.

FIGS. 11 to 14 illustrate an example of the fail-safe mode as the ON/OFF control pattern for each switching element in case of a short-circuit in any energization system. As illustrated in FIGS. 11 to 14, the short-circuit is classified into four types of faults: a short-circuit in any high-potential side switching element of the inverter; a short-circuit in any low-potential side switching element of the inverter; a short-to-supply of any phase drive line; and a short-to-ground of any phase drive line. The fail-safe mode of FIGS. 11 to 14 is a control pattern applicable to both of the first energization system and the second energization system.

According to the fail-safe mode of FIG. 11, control is executed to turn ON either one of any high-potential side switching element and any low-potential side switching element constituting an inverter of a short-circuited energization system while turning OFF the other. Which element to turn ON is determined according to the fault type. According to the fail-safe mode of FIG. 11, if any high-potential side switching element has a short-circuit, microcomputer 302 chooses a control pattern that turns OFF all the high-potential side switching elements while turning ON all the low-potential side switching elements.

Furthermore, according to the fail-safe mode of FIG. 11, if any low-potential side switching element has a short-circuit, more specifically, either in case of a short-to-supply of any phase drive line or in case of a short-to-ground of any phase drive line, the microcomputer chooses a control pattern that turns ON all the high-potential side switching elements while turning OFF all the low-potential side switching elements. Regarding power supply relays 304 that interrupt power supply to the inverter in the energization system having any fault, if the fault is any one of a short-circuit of any high-potential side switching element, a short-circuit of any low-potential side switching element, and a short-to-ground of any phase drive line, power supply relays 304 are controlled into OFF state. In case of a short-to-supply of any phase drive line, however, power supply relay 304A can be controlled into either ON or OFF state.

Note that in FIGS. 11 to 14, "ON or OFF" in the field of power supply relay indicates that power supply relay 304A can be controlled into either ON or OFF state. Accordingly, in the fail-safe mode of FIG. 11, in case of a short-circuit, power supply relays 304 can be turned OFF regardless of the short-circuited portion. Besides, in case of a short-circuit of any high-potential side switching element, a short-circuit of any low-potential side switching element, or a short-to-ground of any phase drive line, power supply relays 304 can be turned OFF and in case of a short-to-supply of any phase drive line, power supply relays 304 can be kept ON.

According to the fail-safe mode of FIG. 11, if a short-circuit occurs in any high-potential side switching element, all the high-potential side switching elements are controlled into OFF state while all the low-potential side switching elements are controlled into ON state. By this control, the low-potential side switching elements in ON state enable bidirectional current flow, with the result that continuous braking current is generated in the energization system being unenergized. Moreover, the power supply to the inverter is interrupted by turning OFF the power supply relay. As a result, the power supply line is by no means short-circuited to the ground point through the short-circuited high-potential side switching element and the low-potential side switching element controlled into ON state.

In addition, according to the fail-safe mode of FIG. 11, if all the low-potential side switching elements are controlled into OFF state, while all the high-potential side switching elements are controlled into ON state, the high-potential side switching elements in ON state enable bidirectional current flow, with the result that continuous braking current is generated. Moreover, the power supply to the inverter is interrupted by turning OFF the power supply relay. As a result, the power supply line is by no means short-circuited to the ground point through the short-circuited low-potential side switching element and the high-potential side switching element controlled into ON state.

In case a short-to-supply occurs in any drive line of each phase, according to the fail-safe mode of FIG. 11, all the low-potential side switching elements are controlled into OFF state, while all the high-potential side switching elements are controlled into ON state. By this control, the high-potential side switching elements in ON state enable bidirectional current flow, with the result that continuous braking current is generated. In addition, the power supply line is by no means short-circuited to the ground point through the low-potential side switching element.

When any drive line of each phase is short-circuited to the power supply, even if the power supply relay is controlled into OFF state, the power is supplied to the phase drive line. Thus, the power supply relay can be kept ON and also, the power supply relay can be uniformly controlled into OFF state regardless of the type of fault in the first energization system. Furthermore, when any drive line of each phase is grounded, according to the fail-safe mode of FIG. 11, all the low-potential side switching elements are controlled into OFF state while all the high-potential side switching elements are controlled into ON state. By this control, the high-potential side switching elements in ON state enable bidirectional current flow. As a result, the braking current is continuously generated and in addition, the power supply to the inverter is interrupted by turning OFF the power supply relay. Thus, no power supply current flows into the ground point through the grounded portion.

As described above, switching elements of an inverter in a failed energization system are controlled according to the fail-safe mode of FIG. 11 to thereby execute energization control over either the high-potential side switching element or the low-potential side switching element of the failed energization system so as to decrease phase-to-phase impedance. With this configuration, continuous braking current, not half-wave, can be generated in the failed energization system.

Then, if the braking current is continuously generated, at the time of executing compensation control to correct an output from the inverter in the normal energization system so as to cancel out the braking torque, the accuracy of detecting the braking current flowing in each phase is enhanced compared to the half-wave braking current. As a result, the accuracy of compensation control is increased. Moreover, according to the fail-safe mode of FIG. 11, continuous braking current is generated, making it easier to execute the compensation control for the target assist torque based on the braking current than the half-wave braking current. A control program can be hereby simplified. Hence, development costs for the control program can be saved and the capacity of the control program can be reduced, leading to reduction in product costs.

Note that according to the fail-safe mode of FIG. 11, any switching element in a short-circuited one is not controlled into ON state. As in the fail-safe mode of FIG. 12, however, all switching elements in the short-circuited one as well as the other normal one can be controlled into ON state. Furthermore, in case any phase drive line is grounded, controlling the power supply relay into OFF state restrains power supply current from flowing into the ground point through the grounded portion. Thus, according to the fail-safe mode of FIG. 12, the high-potential side switching element can be controlled into ON state and also, the low-potential side switching element can be controlled into ON state.

Note that in the fail-safe modes of FIGS. 11 and 12, the same ON/OFF control is executed on the switching element and the power supply relay in case of a short-to-supply of any drive line. Also even in the case of adopting the fail-safe mode of FIG. 12, similar to the ON/OFF control over the switching elements based on the fail-safe mode of FIG. 11, continuous braking current is generated and similar advantageous functions and effects are achieved.

As in the fail-safe mode of FIG. 13, in case a short-circuit occurs in any low-potential side switching element and in case a short-circuit occurs in any high-potential side switching element, the switching element in the short-circuited one can be controlled into ON state and also, the switching element in the normal one can be controlled into OFF state. If the switching element in the normal one is controlled into OFF state, the switching element in OFF state can stop power supply current from flowing into the ground point. Regardless of whether the power supply relay is turned ON or OFF, similar advantageous functions and effects can be obtained.

Moreover, as in the fail-safe mode of FIG. 13, if any drive line is grounded, the high-potential side switching element and the low-potential side switching element can be controlled into OFF state and ON state, respectively. In this case, the high-potential side switching element in OFF state can stop power supply current from flowing into the ground point. Thus, regardless of whether the power supply relay is turned ON or OFF, similar advantageous functions and effects can be obtained. In other words, the fail-safe mode of FIG. 13 is also applicable to a motor drive circuit not equipped with the power supply relay that interrupts power supply to the individual inverters.

Here, in the fail-safe mode of FIGS. 11, 12, and 13, the same ON/OFF control is executed on the switching element and the power supply relay in case of the short-to-supply of any drive line. Even according to the control pattern of FIG. 13, the power supply relay can be controlled into either ON or OFF state in case of the short-to-supply of the drive line. More specifically, according to the fail-safe mode of FIG. 13 as well as the fail-safe mode of FIG. 11 or 12, continuous braking current can be generated. In addition, there achieve advantageous function and effect that braking current less fluctuates depending on the fault type and also the power supply relay does not have to undergo fault control against every fault.

Furthermore, according to the fail-safe mode of FIG. 14, all switching elements constituting the inverter in the short-circuited energization system are controlled into OFF state regardless of the fault location. Here, in the fail-safe mode of FIG. 14, the power supply relay 304 can be controlled into either ON or OFF state. As illustrated in FIG. 14, if adopting a mode that controls into OFF state, all switching elements constituting the inverter in the energization system having a short-circuit, even in case of a short-circuit of any high-potential side switching element, a short-circuit of any low-potential side switching element, a short-to-supply of any phase drive line, or a short-to-ground of any phase drive line, power supply current hardly flows into the ground point. Accordingly, electronic control unit 150 can uniformly control power supply relay 304 into ON or OFF state according to the fail-safe mode of FIG. 14 regardless of the fault type.

Next, the processing for changing the control parameters in step S513 is described in detail. In case of a short-circuit in the first energization system, loop current is generated by way of the short-circuited portion, whereby a magnetic flux generated through energization of the normal second energization system is cancelled out and the apparent inductance in the second energization system reduces. Thus, when the first energization system is stopped and electric motor 130 is driven by controlling the energization of the second energization system, an overshoot is more likely to appear in energization current.

To overcome the above, microcomputer 302 reduces responsiveness to the output control in second inverter 1B compared to when the first energization system has no short-circuit, in order to prevent overshoot of the energization current in the second energization system. More specifically, microcomputer 302 reduces a control gain at the output control on second inverter 1B compared to when the first energization system has no short-circuit, hereby lowering the responsiveness to the output control in second inverter 1B compared to when the first energization system has no short-circuit.

To give an example of the processing for lowering the responsiveness to the output control in the inverter, microcomputer 302 can reduce the gain at the processing of determining a manipulated variable of the inverter according to the control deviation. In other words, if the duty ratio of PWM control on the switching element in the inverter is calculated by the proportion, the integration, and the differential according to a difference between an actual current value and a current command value, microcomputer 302 corrects at least one of the proportional constant, the integral constant, and the differential constant so as to reduce the responsiveness. Moreover, in order to change the control gain, microcomputer 302 can execute processing for reducing the cutoff frequency in low-pass filtering for current detection values.

As described above, since the responsiveness to the output control in second inverter 1B is lowered, even if the apparent coil inductance in the second energization system is decreased, it is possible to prevent overshoot in the second energization system and thus to avoid the erroneous detection of any abnormality in the second energization system due to such overshoot. That is, when the first energization system having a short-circuit is stopped and electric motor 130 is driven by energization control on the normal second energization system, if the overshoot appears in the energization current for the second energization system under the influence of the loop current in the first energization system, by which the second energization system is considered failed, both the energization systems should be stopped to disable the driving of electric motor 130.

In view of the above, as the second energization system can operate normally, overshoot is restrained in the energization current of the second energization system so as not to erroneously diagnose the second energization system as having any fault under the influence of the loop current in the first energization system, whereby the second energization system can keep driving electric motor 130. In addition, if the apparent inductance in the second energization system is reduced and the energization current increases, it is more likely that the system is diagnosed as failed during the first diagnosis processing as to overcurrent or energization control. Hence, microcomputer 302 increases, as an example of changing the control parameter, a threshold of a peak value of motor current or a threshold of the difference between an estimated value of phase current and a detection value of the phase current, compared to when the first energization system normally operates. This makes it difficult to diagnose the second energization system as failed. Accordingly, the second energization system is hardly diagnosed erroneously at the first diagnosis processing.

Furthermore, microcomputer 302 can correct, instead of or together with changing the threshold used for the diagnosis processing, detection data such as a peak value of motor current, a detection value of phase current, and a difference between an estimated value of phase current and a detection value of actual current so as to diminish the possibility of erroneous abnormality determination, i.e., reduce an absolute value. Note that microcomputer 302 can change at least one of the control gain and the state variable such as the detection data or threshold used in the first diagnosis processing.

As for the aforementioned control processing for changing the fail-safe mode as the control pattern for the switching element in the first energization system, which is applied to any abnormality in the first energization system or that for changing the control parameter for the second energization system, both apply to the configuration where the drive line of each phase is not equipped with phase relay 313. If the drive line of each phase is equipped with phase relay 313, the following configuration is applicable. That is, all switching elements of the failed first energization system are controlled into OFF state, all phase relays 313 in the first energization system are controlled into OFF state, and the control parameter for the normal second energization system is not changed.

This is because, if phase relays 313 are disposed, all phase relays 313 are turned OFF, making it possible to prevent loop current from flowing through a short-circuited portion and avoid cancellation of magnetic flux generated by energizing the normal second energization system. For example, in case a short-circuit occurs between the energization systems or in case the first energization system is failed while the second energization system operates normally, microcomputer 302 implements the aforementioned processing in steps S512 and S513 to stop the first energization system while executing energization control on the second energization system.

Under this condition, if returning to step S501, microcomputer 302 follows steps S501, S502, S503, and step S504 in the stated order. As long as the second energization system operates normally, the microcomputer stops the first energization system and keeps energization control over the second energization system. Microcomputer 302 determines that the fault in the first energization system is confirmed, the first energization system is stopped, and the energization control on the second energization system is executed based on the aforementioned first system diagnosis flag, etc. If detecting a fault in the second energization system in this state, the microcomputer stops the second energization system as well, hereby stopping the driving of electric motor 130.

Note that steps S515 to S523 are aimed at the energization system different from in steps S505 to S513 above, but the executed processing is similar to that in steps S505 to S513. Accordingly, if the first energization system operates normally and the second energization system has any abnormality, microcomputer 302 proceeds to step S515 to resume the processing ended in step S504. As in the above processing, the microcomputer executes the second diagnosis processing on the second energization system. If any abnormality is detected in the second energization system through the second diagnosis processing, the second energization system is stopped and electric motor 130 is driven by energization control on the first energization system.

At this time, if the second energization system has a short-circuit, microcomputer 302 controls second inverter 1B of the second energization system into a predetermined state and also changes the control parameter for energization control on the first energization system. On the other hand, for example, if the first energization system has a short-circuit and then, the second energization system is erroneously diagnosed as failed through the first diagnosis processing under the influence of the short-circuit, microcomputer 302 proceeds from step S504 to steps S515, S516, and S517. After controlling the inverter into OFF state, the microcomputer waits for a standby time and then proceeds to step S518.

In this example, since the first energization system has a short-circuit, even if microcomputer 302 waits for the standby time after controlling the inverter into OFF state and then proceeds to step S518, the microcomputer determines that the total sum of current values at three phases in the first energization system is an outlier. Thus, microcomputer 302 proceeds from step S518 to step S524. In step S524, as the first system diagnosis flag is not set to "3", the microcomputer further proceeds to step S527.

In step S527, microcomputer 302 sets the first system diagnosis flag to "3". Next, microcomputer 302 follows the procedure from step S505 onward to execute the second diagnosis processing on the first energization system. If the first energization system is diagnosed as failed, the microcomputer proceeds to steps S512 and S513 to stop the first energization system and shift to a mode in which electric motor 130 is driven by energization control on the second energization system. Also when the second energization system has a short-circuit, and the first energization system is erroneously diagnosed as failed through the first diagnosis processing under the influence of such short-circuit, similar processing is executed.

According to the processing in the flowcharts illustrated in FIGS. 7 to 10, if a short-circuit occurs in either one of the two energization systems, the other normal energization system keeps operating under the condition that the control parameter is changed. Accordingly, even if loop current is generated in the energization system having the short-circuit, whereby a magnetic flux generated in the normal energization system is cancelled out, it is possible to avoid overshoot in motor current in the normal energization system and also prevent the normal energization system from being erroneously diagnosed as failed. Even if either one of the energization systems has a short-circuit, the other normal energization system keeps driving electric motor 130, whereby an assist torque can be generated in the electric power steering device.

When either one of the energization systems has a short-circuit and overshoot appears in energization current at the other energization system, if such abnormality in the other energization system is detected ahead, the second diagnosis processing is executed on the former one based on the total sum of detection values of phase current in the former one, which is an outlier, whereby a short-circuit can be detected. Therefore, both the energization systems are hardly stopped by mistake at a time.

In addition, if a short-circuit occurs between the first energization system and the second energization system, all switching elements in either one are turned OFF. After the elapse of some period necessary for the elements to actually stabilize in OFF state, i.e., under the condition that no current flows in and out between the energization systems, the other energization system is diagnosed as to the control error. Accordingly, if a short-circuit occurs between the energization systems, it is possible to prevent both the energization systems from being diagnosed as failed and also, allow the other energization system to keep driving electric motor 130.

Hereinbefore, the present invention is described in detail on the basis of the preferred embodiment but it is obvious that one skilled in the art can make various modifications within the basic technical ideas and teachings of the present invention. The above controller for an electric motor of the present invention is applicable to an electric motor where three-phase coils U, V, and W are connected by means of delta connection as well as electric motor 130 having three-phase coils U, V, and W star-connected.

Moreover, in the processing illustrated in the flowcharts of FIGS. 7 to 10, while one energization system is being under the second diagnosis processing, the other energization system is not determined as to whether any abnormality has been found through the first diagnosis processing. During the second diagnosis processing on one energization system, however, it is possible to check whether any abnormality has been found in the other energization system through the first diagnosis processing. In case any abnormality has been detected through the first diagnosis processing, all the switching elements in the failed energization system can be controlled into OFF state and put on standby.

Furthermore, the controller for an electric motor of the present invention is applicable as well to an apparatus equipped with three or more coil sets including three-phase coils U, V, and W and three or more inverters for driving the respective coil sets.

Furthermore, the controller of the present invention is applicable to not only the electric motor that generates a steering assist force in a vehicle electric power steering device but also to various electric motors such as an electric motor serving as an actuator for a variable valve mechanism of an engine and an electric motor used for driving a pump.

In addition, if any one of plural energization systems is failed, a warning device such as a warning lamp or buzzer can be operated to inform a driver of the vehicle about an abnormality etc. in an electric power steering device incorporating the electric motor.

REFERENCE SYMBOL LIST 1A first inverter
1B second inverter 2A first coil set
2B second coil set
4 output voltage calculating unit
5 motor rotational speed calculating unit
6 target value calculating unit
7A first output duty calculating unit
7B second output duty calculating unit
8A first two-to-three phase converting unit
8B second two-to-three phase converting unit
9A first dead time compensation unit
9B second dead time compensation unit
11 three-to-two phase converting unit
12 determination unit
13A first ON/OFF control unit
13B second ON/OFF control unit
130 electric motor
150 electronic control unit (controller)
301UA, 301VA, 301WA, 301UB, 301VB, 301WB current sensor (current detection device)
302 microcomputer
304A, 304B power supply relay
307 voltage monitor circuit
UHA, VHA, WHA, UHB, VHB, WHB high-potential side switching element
ULA, VLA, WLA, ULB, VLB, WLB low-potential side switching element

The invention claimed is:

1. A controller for an electric motor equipped with a plurality of energization systems composed of an inverter and coils corresponding to a plurality of phases, the controller comprising a control unit for detecting occurrence of a short-circuit in each of the energization systems through a first processing for detecting occurrence of an abnormality in the energization system being energized and a second processing for detecting occurrence of an abnormality in the energization system being unenergized, and changing, if a short-circuit is detected in at least one of the energization systems, a control parameter for the energization system having no short-circuit detected,
wherein the control unit executes the second processing on the energization system having an abnormality detected through the first processing and executes, when no abnormality is detected through the second processing, the second processing on the energization system having no abnormality detected through the first processing.

2. The controller for an electric motor according to claim 1, wherein when executing the second processing on the energization system having no abnormality detected through the first processing, the control unit allows driving of the inverter in the energization system having an abnormality detected through the first processing.

3. The controller for an electric motor according to claim 1, wherein when a short-circuit is detected in at least one of the energization systems, the control unit changes a control parameter for the energization system having no short-circuit detected so that responsiveness to output control in the energization system having no short-circuit detected can be lowered compared to when no short-circuit is detected in all the energization systems.

4. The controller for an electric motor according to claim 3, wherein when a short-circuit is detected in at least one of the energization systems, the control unit reduces a gain of output control in the energization system having no short-circuit detected compared to when no short-circuit is detected in all the energization systems.

5. The controller for an electric motor according to claim 1, wherein when a short-circuit is detected in at least one of the energization systems, the control unit changes a state variable used in the first processing as the control parameter so as to make it difficult to detect an abnormality through the first processing.

6. The controller for an electric motor according to claim 1, wherein the control unit executes at least one of processing that disables driving of the inverter in the energization system having a short-circuit detected and processing that turns OFF a phase relay disposed on an energization line of the coil.

7. The controller for an electric motor according to claim 1, wherein when a short-circuit is detected in at least one of the energization systems, the control unit stops the energization system having the short-circuit detected, while changing a control parameter for the energization system having no short-circuit detected so as to keep the energization system operating.

8. The controller for an electric motor according to claim 7, wherein when a short-circuit is detected in at least one of the energization systems, the control unit changes at least one of a detection value of a state variable and a threshold thereof, which are compared to detect occurrence of a short-circuit, as the control parameter so as to make it difficult to detect a short-circuit.

9. The controller for an electric motor according to claim 7, wherein when a short-circuit is detected in at least one of the energization systems, the control unit reduces a gain of processing for determining a manipulated variable according to a control deviation in the energization system having no short-circuit detected.

10. A control method for an electric motor equipped with a plurality of energization systems composed of an inverter and coils corresponding to a plurality of phases, the method comprising the steps of:
detecting occurrence of a short-circuit in each of the energization systems in response to a detection signal indicating an electrical condition of each of the coils through a first processing for detecting occurrence of an abnormality in the energization system being energized and a second processing for detecting occurrence of an abnormality in the energization system being unenergized; and
reading a result of detecting occurrence of a short-circuit in each of the energization systems and changing, when a short-circuit is detected in at least one of the energization systems, a control parameter for the energization system having no short-circuit detected,
wherein in the step of detecting occurrence of a short-circuit, the second processing is executed on the energization system having an abnormality detected through the first processing and when no abnormality is detected through the second processing, the second processing is executed on the energization system having no abnormality detected through the first processing.

11. The control method for an electric motor according to claim 10, further comprising the step of stopping, when the result of detecting occurrence of a short-circuit in each of the energization systems shows that a short-circuit is detected in at least one of the energization systems, the energization system having the short-circuit detected and allowing the energization system having no short-circuit detected to keep operating.

12. The control method for an electric motor according to claim 11, wherein the step of changing a control parameter comprises the step of changing a control parameter for the energization system having no short-circuit detected so as to make it difficult to detect a short-circuit.

13. A controller for an electric motor equipped with a plurality of energization systems composed of an inverter and coils corresponding to a plurality of phases, the controller comprising a control unit for detecting occurrence of a short-circuit in each of the energization systems, and changing, if a short-circuit is detected in at least one of the energization systems, a control parameter for the energization system having no short-circuit detected so that responsiveness to output control in the energization system having no short-circuit detected can be lowered compared to when no short-circuit is detected in all the energization systems.

14. The controller for an electric motor according to claim 13, wherein when a short-circuit is detected in at least one of the energization systems, the control unit reduces a gain of output control in the energization system having no short-circuit detected compared to when no short-circuit is detected in all the energization systems.

15. The controller for an electric motor according to claim 13, wherein when a short-circuit is detected in at least one of the energization systems, the control unit stops the energization system having the short-circuit detected, while changing a control parameter for the energization system having no short-circuit detected so as to keep the energization system operating.

16. The controller for an electric motor according to claim 15, wherein when a short-circuit is detected in at least one of the energization systems, the control unit changes at least one of a detection value of a state variable and a threshold thereof, which are compared to detect occurrence of a short-circuit, as the control parameter so as to make it difficult to detect a short-circuit.

* * * * *